(12) United States Patent
Raju

(10) Patent No.: US 12,496,185 B2
(45) Date of Patent: Dec. 16, 2025

(54) FLOW GRAFT

(71) Applicant: Seshadri Raju, Jackson, MS (US)

(72) Inventor: Seshadri Raju, Jackson, MS (US)

( * ) Notice: Subject to any disclaimer, the term of this patent is extended or adjusted under 35 U.S.C. 154(b) by 0 days.

(21) Appl. No.: 18/482,830

(22) Filed: Oct. 6, 2023

(65) Prior Publication Data

US 2024/0180727 A1 Jun. 6, 2024

Related U.S. Application Data

(60) Continuation-in-part of application No. 17/817,567, filed on Aug. 4, 2022, now abandoned, which is a continuation of application No. PCT/US2021/071126, filed on Aug. 5, 2021, application No. 18/482,830 is a division of application No. 17/444,558, filed on Aug. 5, 2021, now Pat. No. 11,779,478, which is a continuation-in-part of application No. PCT/US2020/016895, filed on Feb. 5, 2020.

(60) Provisional application No. 63/062,764, filed on Aug. 7, 2020, provisional application No. 62/801,912, filed on Feb. 6, 2019.

(51) Int. Cl.
| | | |
|---|---|---|
| A61F 2/82 | (2013.01) | |
| A61F 2/06 | (2013.01) | |
| A61F 2/07 | (2013.01) | |
| A61F 2/852 | (2013.01) | |
| A61F 2/958 | (2013.01) | |
| A61F 2/844 | (2013.01) | |
| A61F 2/90 | (2013.01) | |

(52) U.S. Cl.
CPC ............ *A61F 2/07* (2013.01); *A61F 2/06* (2013.01); *A61F 2/82* (2013.01); *A61F 2/852* (2013.01); *A61F 2/958* (2013.01); *A61F 2002/826* (2013.01); *A61F 2/844* (2013.01); *A61F 2/90* (2013.01); *A61F 2002/9583* (2013.01); *A61F 2250/0039* (2013.01)

(58) Field of Classification Search
CPC .... A61F 2/82; A61F 2/90; A61F 2/852; A61F 2002/826; A61F 2/04; A61F 2/07
See application file for complete search history.

(56) References Cited

U.S. PATENT DOCUMENTS

2007/0106365 A1 * 5/2007 Andreas ............... A61F 2/958
623/1.11

* cited by examiner

*Primary Examiner* — William H Matthews
(74) *Attorney, Agent, or Firm* — Intellectual Property Consulting, LLC; Bernard F. Meroney

(57) ABSTRACT

The invention includes an improved flow graft. The graft has a portion where the radius r expands with length L over the portion, so that $r^n/L$ is a constant in that portion, where $n \geq 4.0$, or $1 < n < 4$. the graft may have a beginning section that has constant diameter. The invention also includes a method of designing such an expanding graft to suit the application, such as in the venous system, the arterial system, or for dialysis. The invention also includes near constant conductance stents stacks where each stent in the stack has a radius r that grows with length, so that $R^n/L$ is constant where $n \geq 4$.

18 Claims, 27 Drawing Sheets

Constant Flow Stents

Unitary Conduit 1.13 cm 1 cm $$\frac{F}{\Delta P} = * \frac{\pi}{8} * \frac{R^4}{L} * \frac{1}{\eta}$$

$$\frac{F}{\Delta P} = * \frac{3.14}{8} * \frac{R^4}{L} * \frac{1}{0.04}$$

$$\frac{F}{\Delta P} = * \left( \frac{3.14}{8} * \frac{(0.5649)^4}{1} * \frac{1}{0.04} \right)$$

$$\frac{F}{\Delta P} = * \text{①}$$

Conduit with Constant Conductance = 1

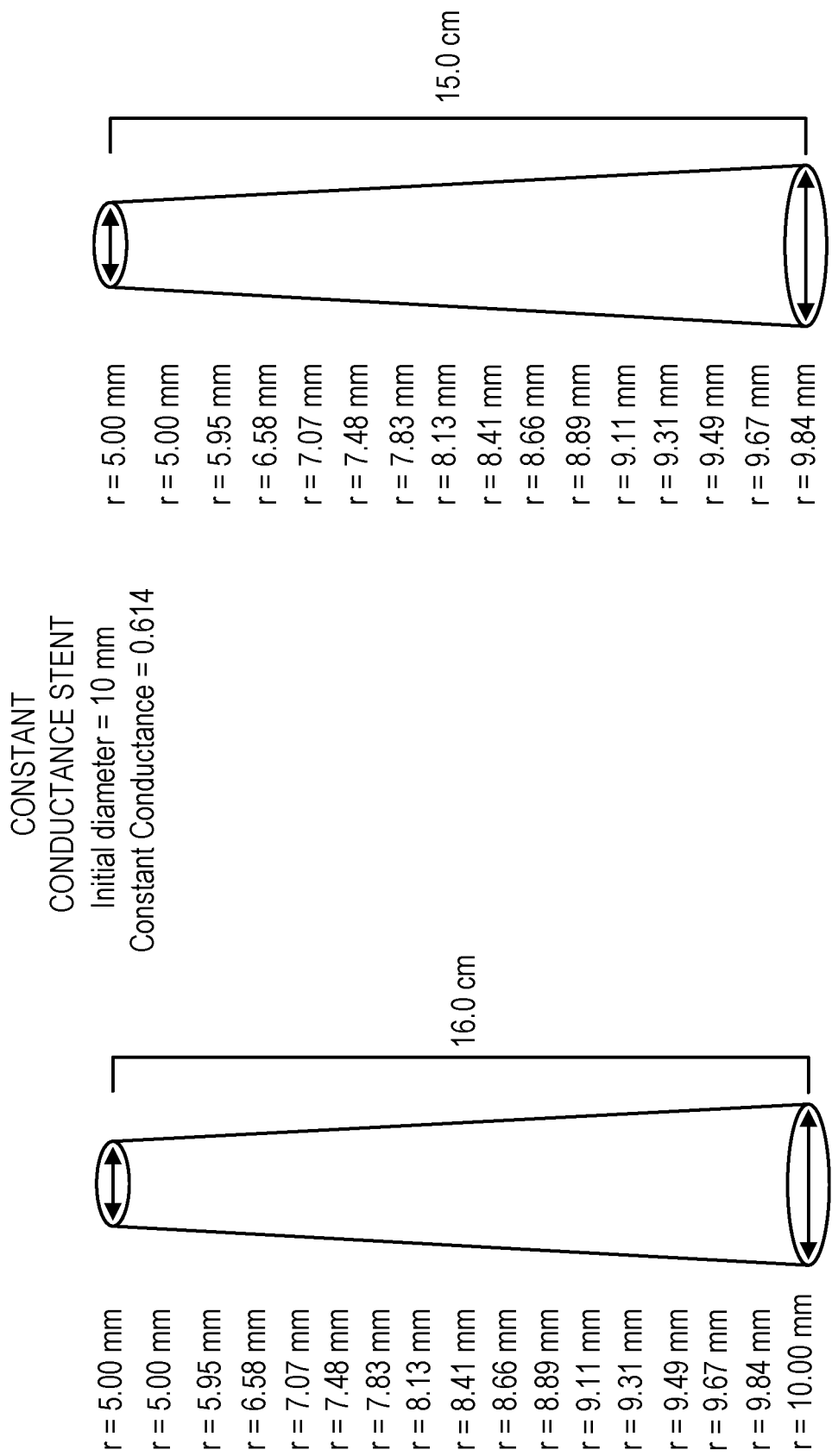

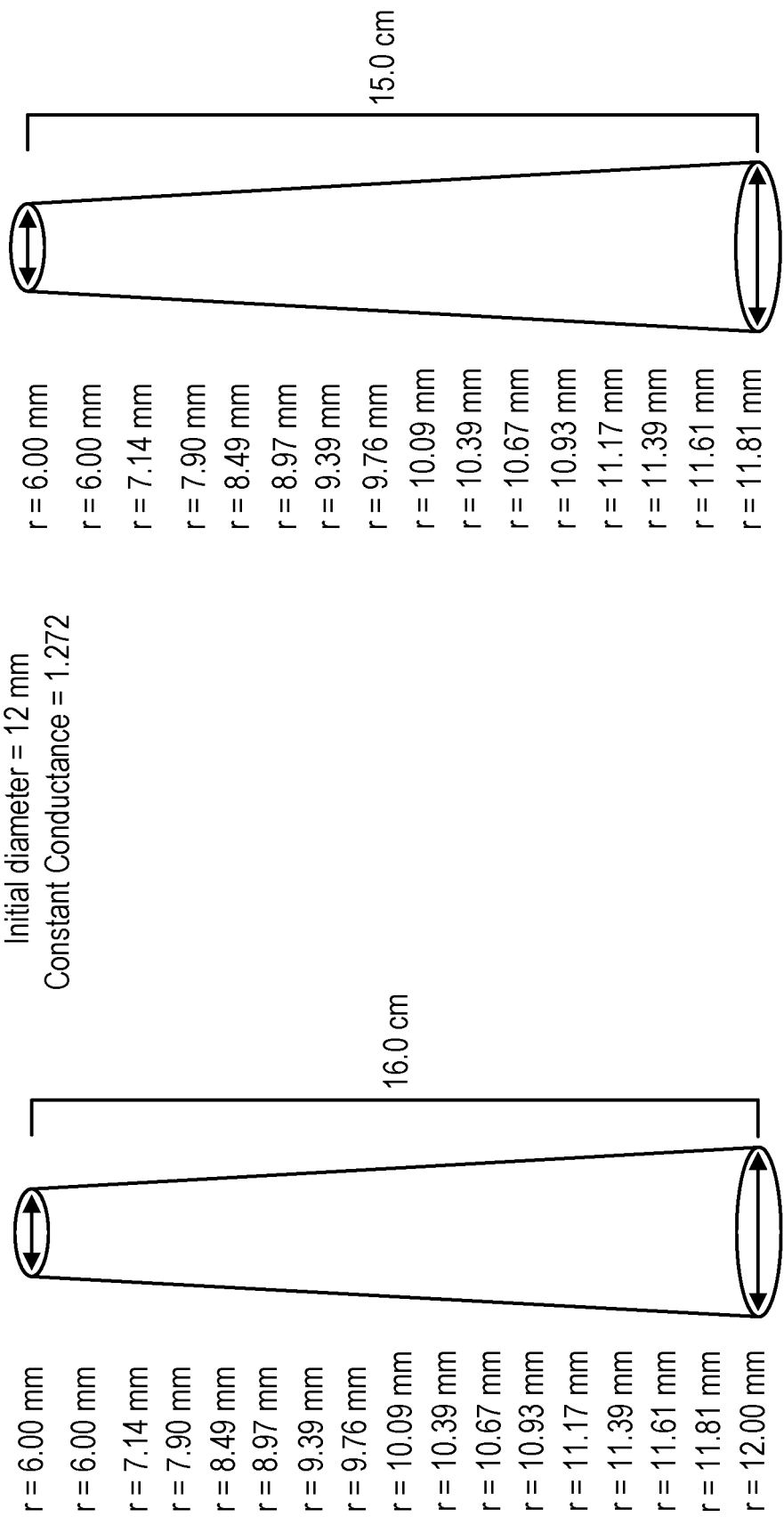

Starting Diameter = 1 cm

| Length (cm) | Radius (cm) | Diameter (cm) | Geometric Factor ($R_{cm}^4/L_{cm}$) |
|---|---|---|---|
| 1 | 0.5000 | 1.0000 | 0.0625 |
| 2 | 0.5946 | 1.1892 | 0.0625 |
| 3 | 0.6580 | 1.3161 | 0.0625 |
| 4 | 0.7071 | 1.4142 | 0.0625 |
| 5 | 0.7477 | 1.4953 | 0.0625 |
| 6 | 0.7825 | 1.5651 | 0.0625 |
| 7 | 0.8133 | 1.6266 | 0.0625 |
| 8 | 0.8409 | 1.6818 | 0.0625 |
| 9 | 0.8660 | 1.7321 | 0.0625 |
| 10 | 0.8891 | 1.7783 | 0.0625 |
| 11 | 0.9106 | 1.8212 | 0.0625 |
| 12 | 0.9306 | 1.8612 | 0.0625 |
| 13 | 0.9494 | 1.8988 | 0.0625 |
| 14 | 0.9672 | 1.9343 | 0.0625 |
| 15 | 0.9840 | 1.9680 | 0.0625 |
| 16 | 1.0000 | 2.0000 | 0.0625 |

FIG. 5A

Starting Diameter = 1.2 cm

| Length (cm) | Radius (cm) | Diameter (cm) | Geometric Factor ($R_{cm}^4/L_{cm}$) |
|---|---|---|---|
| 1 | 0.6000 | 1.2000 | 0.1296 |
| 2 | 0.7135 | 1.4270 | 0.1296 |
| 3 | 0.7896 | 1.5793 | 0.1296 |
| 4 | 0.8485 | 1.6971 | 0.1296 |
| 5 | 0.8972 | 1.7944 | 0.1296 |
| 6 | 0.9391 | 1.8781 | 0.1296 |
| 7 | 0.9759 | 1.9519 | 0.1296 |
| 8 | 1.0091 | 2.0182 | 0.1296 |
| 9 | 1.0392 | 2.0785 | 0.1296 |
| 10 | 1.0670 | 2.1339 | 0.1296 |
| 11 | 1.0927 | 2.1854 | 0.1296 |
| 12 | 1.1167 | 2.2335 | 0.1296 |
| 13 | 1.1393 | 2.2786 | 0.1296 |
| 14 | 1.1606 | 2.3212 | 0.1296 |
| 15 | 1.1808 | 2.3616 | 0.1296 |
| 16 | 1.2000 | 2.4000 | 0.1296 |

FIG. 5B

| Length (cm) | Radius (mm) | Diameter (mm) | Geometric Factor ($r_{cm}^4/L_{cm}$) |
|---|---|---|---|
| 1 | 0.5000 | 1.0000 | 0.00000625 |
| 2 | 0.5946 | 1.1892 | 0.00000625 |
| 3 | 0.6580 | 1.3161 | 0.00000625 |
| 4 | 0.7071 | 1.4142 | 0.00000625 |
| 5 | 0.7477 | 1.4953 | 0.00000625 |
| 6 | 0.7825 | 1.5651 | 0.00000625 |
| 7 | 0.8133 | 1.6266 | 0.00000625 |
| 8 | 0.8409 | 1.6818 | 0.00000625 |
| 9 | 0.8660 | 1.7321 | 0.00000625 |
| 10 | 0.8891 | 1.7783 | 0.00000625 |
| 11 | 0.9106 | 1.8212 | 0.00000625 |
| 12 | 0.9306 | 1.8612 | 0.00000625 |
| 13 | 0.9494 | 1.8988 | 0.00000625 |
| 14 | 0.9672 | 1.9343 | 0.00000625 |
| 15 | 0.9840 | 1.9680 | 0.00000625 |
| 16 | 1.0000 | 2.0000 | 0.00000625 |
| 17 | 1.0153 | 2.0305 | 0.00000625 |
| 18 | 1.0299 | 2.0598 | 0.00000625 |
| 19 | 1.0439 | 2.0878 | 0.00000625 |
| 20 | 1.0574 | 2.1147 | 0.00000625 |
| 21 | 1.0703 | 2.1407 | 0.00000625 |
| 22 | 1.0829 | 2.1657 | 0.00000625 |
| 23 | 1.0950 | 2.1899 | 0.00000625 |
| 24 | 1.1067 | 2.2134 | 0.00000625 |
| 25 | 1.1180 | 2.2361 | 0.00000625 |
| 26 | 1.1291 | 2.2581 | 0.00000625 |
| 27 | 1.1398 | 2.2795 | 0.00000625 |
| 28 | 1.1502 | 2.3003 | 0.00000625 |
| 29 | 1.1603 | 2.3206 | 0.00000625 |
| 30 | 1.1702 | 2.3403 | 0.00000625 |

FIG. 6A-1

| Length (cm) | Radius (mm) | Diameter (mm) | Geometric Factor ($r_{cm}^4/L_{cm}$) |
|---|---|---|---|
| 1 | 1.0000 | 2.0000 | 0.0001 |
| 2 | 1.1892 | 2.3784 | 0.0001 |
| 3 | 1.3161 | 2.6321 | 0.0001 |
| 4 | 1.4142 | 2.8284 | 0.0001 |
| 5 | 1.4953 | 2.9907 | 0.0001 |
| 6 | 1.5651 | 3.1302 | 0.0001 |
| 7 | 1.6266 | 3.2532 | 0.0001 |
| 8 | 1.6818 | 3.3636 | 0.0001 |
| 9 | 1.7321 | 3.4641 | 0.0001 |
| 10 | 1.7783 | 3.5566 | 0.0001 |
| 11 | 1.8212 | 3.6423 | 0.0001 |
| 12 | 1.8612 | 3.7224 | 0.0001 |
| 13 | 1.8988 | 3.7977 | 0.0001 |
| 14 | 1.9343 | 3.8687 | 0.0001 |
| 15 | 1.9680 | 3.9360 | 0.0001 |
| 16 | 2.0000 | 4.0000 | 0.0001 |
| 17 | 2.0305 | 4.0611 | 0.0001 |
| 18 | 2.0598 | 4.1195 | 0.0001 |
| 19 | 2.0878 | 4.1756 | 0.0001 |
| 20 | 2.1147 | 4.2295 | 0.0001 |
| 21 | 2.1407 | 4.2814 | 0.0001 |
| 22 | 2.1657 | 4.3315 | 0.0001 |
| 23 | 2.1899 | 4.3799 | 0.0001 |
| 24 | 2.2134 | 4.4267 | 0.0001 |
| 25 | 2.2361 | 4.4721 | 0.0001 |
| 26 | 2.2581 | 4.5162 | 0.0001 |
| 27 | 2.2795 | 4.5590 | 0.0001 |
| 28 | 2.3003 | 4.6007 | 0.0001 |
| 29 | 2.3206 | 4.6412 | 0.0001 |
| 30 | 2.3403 | 4.6807 | 0.0001 |

FIG. 6A-2

| Length (cm) | Radius (mm) | Diameter (mm) | Geometric Factor ($r_{cm}^4/L_{cm}$) |
|---|---|---|---|
| 1 | 2.0000 | 4.0000 | 0.0016 |
| 2 | 2.3784 | 4.7568 | 0.0016 |
| 3 | 2.6321 | 5.2643 | 0.0016 |
| 4 | 2.8284 | 5.6569 | 0.0016 |
| 5 | 2.9907 | 5.9814 | 0.0016 |
| 6 | 3.1302 | 6.2603 | 0.0016 |
| 7 | 3.2532 | 6.5063 | 0.0016 |
| 8 | 3.3636 | 6.7272 | 0.0016 |
| 9 | 3.4641 | 6.9282 | 0.0016 |
| 10 | 3.5566 | 7.1131 | 0.0016 |
| 11 | 3.6423 | 7.2846 | 0.0016 |
| 12 | 3.7224 | 7.4448 | 0.0016 |
| 13 | 3.7977 | 7.5953 | 0.0016 |
| 14 | 3.8687 | 7.7373 | 0.0016 |
| 15 | 3.9360 | 7.8720 | 0.0016 |
| 16 | 4.0000 | 8.0000 | 0.0016 |
| 17 | 4.0611 | 8.1222 | 0.0016 |
| 18 | 4.1195 | 8.2391 | 0.0016 |
| 19 | 4.1756 | 8.3512 | 0.0016 |
| 20 | 4.2295 | 8.4590 | 0.0016 |
| 21 | 4.2814 | 8.5628 | 0.0016 |
| 22 | 4.3315 | 8.6629 | 0.0016 |
| 23 | 4.3799 | 8.7598 | 0.0016 |
| 24 | 4.4267 | 8.8535 | 0.0016 |
| 25 | 4.4721 | 8.9443 | 0.0016 |
| 26 | 4.5162 | 9.0324 | 0.0016 |
| 27 | 4.5590 | 9.1180 | 0.0016 |
| 28 | 4.6007 | 9.2013 | 0.0016 |
| 29 | 4.6412 | 9.2824 | 0.0016 |
| 30 | 4.6807 | 9.3614 | 0.0016 |

FIG. 6A-3

| Length (cm) | Radius (mm) | Diameter (mm) | Geometric Factor ($r_{cm}^4/L_{cm}$) |
|---|---|---|---|
| 1 | 4.0000 | 8.0000 | 0.0256 |
| 2 | 4.7568 | 9.5137 | 0.0256 |
| 3 | 5.2643 | 10.5286 | 0.0256 |
| 4 | 5.6569 | 11.3137 | 0.0256 |
| 5 | 5.9814 | 11.9628 | 0.0256 |
| 6 | 6.2603 | 12.5207 | 0.0256 |
| 7 | 6.5063 | 13.0126 | 0.0256 |
| 8 | 6.7272 | 13.4543 | 0.0256 |
| 9 | 6.9282 | 13.8564 | 0.0256 |
| 10 | 7.1131 | 14.2262 | 0.0256 |
| 11 | 7.2846 | 14.5693 | 0.0256 |
| 12 | 7.4448 | 14.8897 | 0.0256 |
| 13 | 7.5953 | 15.1906 | 0.0256 |
| 14 | 7.7373 | 15.4747 | 0.0256 |
| 15 | 7.8720 | 15.7439 | 0.0256 |
| 16 | 8.0000 | 16.0000 | 0.0256 |
| 17 | 8.1222 | 16.2443 | 0.0256 |
| 18 | 8.2391 | 16.4781 | 0.0256 |
| 19 | 8.3512 | 16.7024 | 0.0256 |
| 20 | 8.4590 | 16.9179 | 0.0256 |
| 21 | 8.5628 | 17.1256 | 0.0256 |
| 22 | 8.6629 | 17.3259 | 0.0256 |
| 23 | 8.7598 | 17.5195 | 0.0256 |
| 24 | 8.8535 | 17.7069 | 0.0256 |
| 25 | 8.9443 | 17.8885 | 0.0256 |
| 26 | 9.0324 | 18.0648 | 0.0256 |
| 27 | 9.1180 | 18.2361 | 0.0256 |
| 28 | 9.2013 | 18.4026 | 0.0256 |
| 29 | 9.2824 | 18.5648 | 0.0256 |
| 30 | 9.3614 | 18.7228 | 0.0256 |

FIG. 6A-4

| Length (cm) | Radius (mm) | Diameter (mm) | Geometric Factor ($r_{cm}^4/L_{cm}$) |
|---|---|---|---|
| 1 | 16.0000 | 32.0000 | 6.5536 |
| 2 | 19.0273 | 38.0546 | 6.5536 |
| 3 | 21.0572 | 42.1144 | 6.5536 |
| 4 | 22.6274 | 45.2548 | 6.5536 |
| 5 | 23.9256 | 47.8512 | 6.5536 |
| 6 | 25.0414 | 50.0827 | 6.5536 |
| 7 | 26.0252 | 52.0504 | 6.5536 |
| 8 | 26.9087 | 53.8174 | 6.5536 |
| 9 | 27.7128 | 55.4256 | 6.5536 |
| 10 | 28.4525 | 56.9049 | 6.5536 |
| 11 | 29.1386 | 58.2771 | 6.5536 |
| 12 | 29.7794 | 59.5587 | 6.5536 |
| 13 | 30.3813 | 60.7625 | 6.5536 |
| 14 | 30.9494 | 61.8988 | 6.5536 |
| 15 | 31.4878 | 62.9757 | 6.5536 |
| 16 | 32.0000 | 64.0000 | 6.5536 |
| 17 | 32.4887 | 64.9774 | 6.5536 |
| 18 | 32.9563 | 65.9125 | 6.5536 |
| 19 | 33.4048 | 66.8095 | 6.5536 |
| 20 | 33.8359 | 67.6718 | 6.5536 |
| 21 | 34.2511 | 68.5022 | 6.5536 |
| 22 | 34.6518 | 69.3036 | 6.5536 |
| 23 | 35.0390 | 70.0780 | 6.5536 |
| 24 | 35.4138 | 70.8276 | 6.5536 |
| 25 | 35.7771 | 71.5542 | 6.5536 |
| 26 | 36.1296 | 72.2592 | 6.5536 |
| 27 | 36.4721 | 72.9442 | 6.5536 |
| 28 | 36.8052 | 73.6105 | 6.5536 |
| 29 | 37.1295 | 74.2591 | 6.5536 |
| 30 | 37.4456 | 74.8911 | 6.5536 |

FIG. 6A-5

CONSTANT CONDUCTANCE
Stent
16.0 cm
D = 20.0 mm
D = 10 mm

CONSTANT CONDUCTANCE
Balloon Dilator
L = 16.0 cm
D = 20 mm
D = 10mm

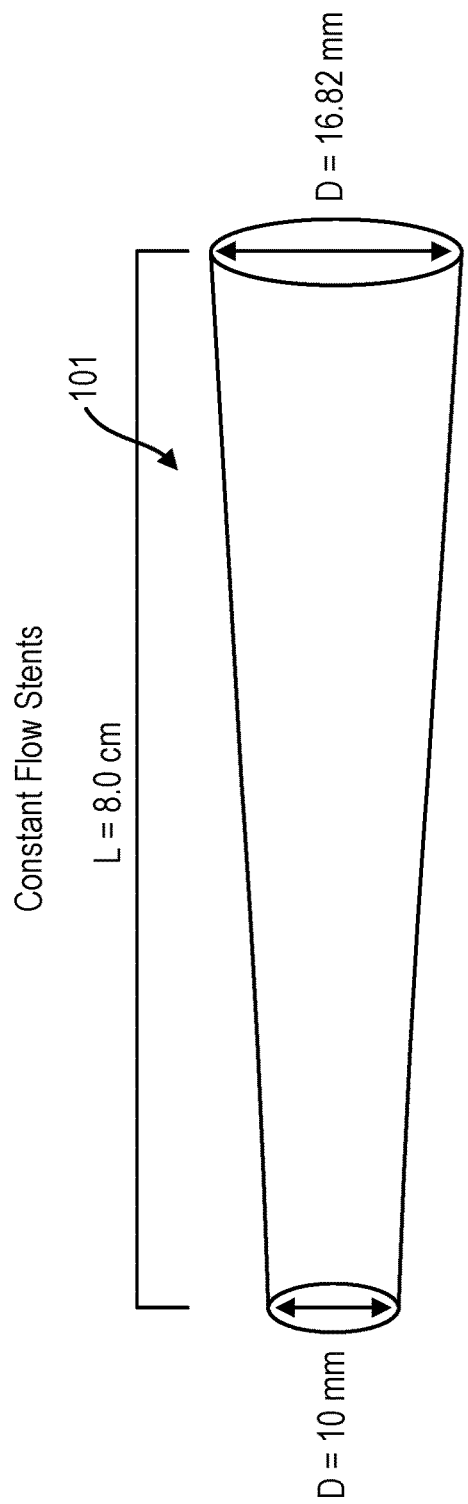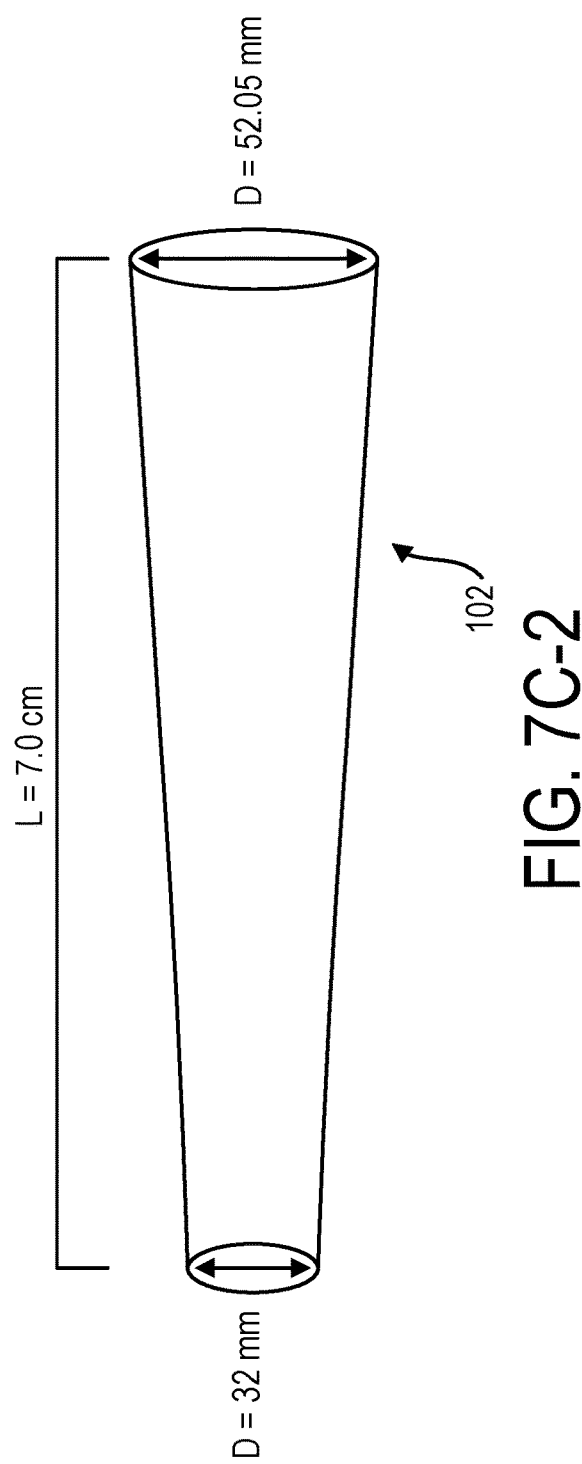
Constant Flow Stents
FIG. 7C-1
FIG. 7C-2

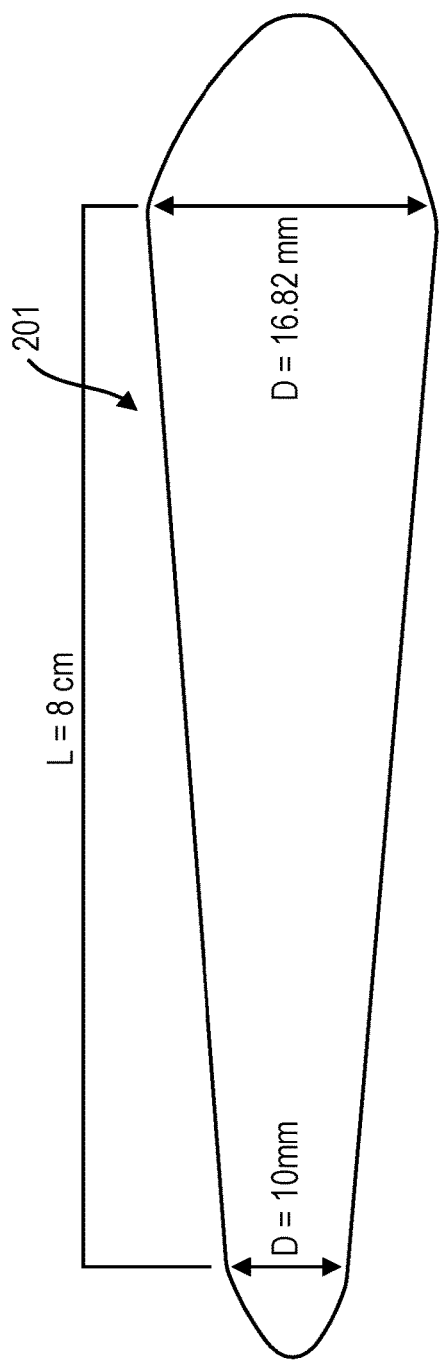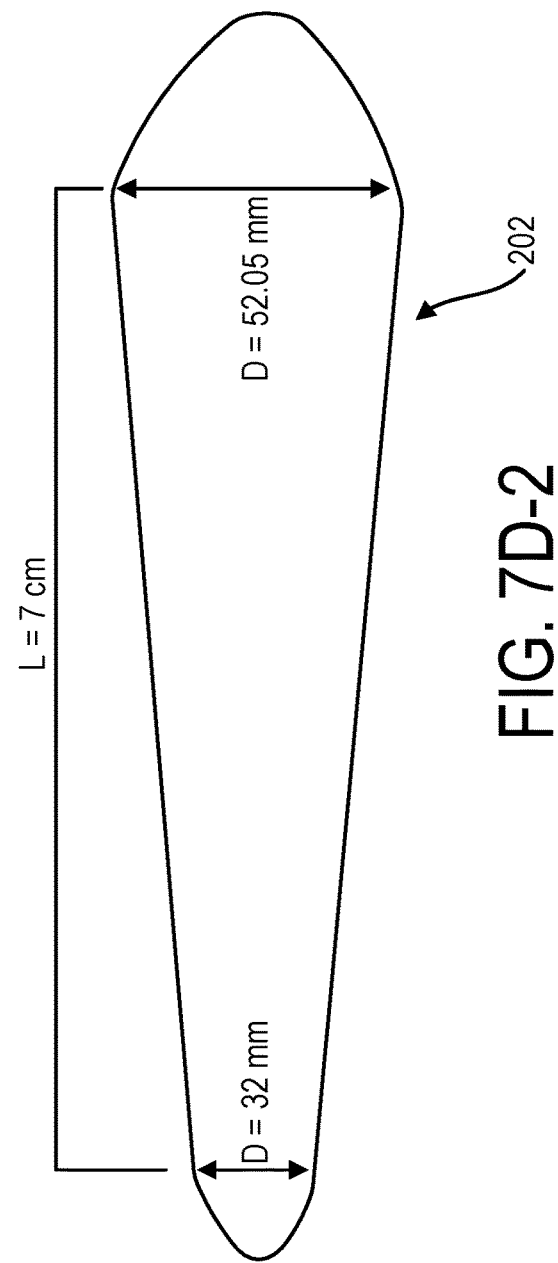
FIG. 7D-1  FIG. 7D-2

FLOW GRAFT

PRIORITY CLAIM

This application is a divisional in part of U.S. application Ser. No. 17/444,558, filed on Aug. 5, 2021, which was a continuation in part of PCT/US2020/16895 filed on Feb. 5, 2020, which claimed the priority benefit of U.S. Provisional Application 62/801,912 filed on Feb. 6, 2019, all of which is incorporated by reference in its entirety.

This application is also a continuation in part of U.S. application Ser. No. 17/817,567 filed on Aug. 4, 2022, which was a continuation of PCT/US/2021/071126, filed on Aug. 5, 2021, which application claimed the priority benefit of U.S. Provisional Application 63/062,764, filed on Aug. 7, 2020, all of which are incorporated by reference.

BACKGROUND OF THE INVENTION

Stenosis is a narrowing or partial occlusion of a lumen, such as in the arterial or venous system. A focal stenosis is characterized by a rapid change in lumen cross-sectional area that occurs over a very short segment length of the vessel, typically over a length of about 1 to 2 cm. Diffuse stenosis is stenosis that is not focal and is characterized by a narrowing of the lumen which occurs over greater vessel segment length, typically lengths greater than 2 cm. Stenosis is accompanied by changes in velocity of blood flow through the narrowed lumen.

A stenosis is often treated with a stent. Stents are generally cylindrically shaped devices which function to expand when deployed. Stents may be balloon expandable or self-expanding. The balloon expandable stent is a stent that is usually made of a coil, mesh, or zigzag design. The stent is pre-mounted on a balloon and the inflation of the balloon plastically expands the stent with respect to the balloon diameter. Self-expanding stents are tubular devices stored in an elongated configuration in what is called a delivery system or applicator. The applicator is introduced percutaneously into the body into a vessel at a suitable location and guided through the vessel lumen to the location where the stent is to be released. The delivery system and the stent are often provided with radiological markers with which the positioning and the release of the stent can be monitored in situ under fluoroscopy. Upon release, the stent material auto expands to a predetermined size. Auto expansion is rather weak in many self-expanding stents. This may require pre-dilatation of the stenotic lesion with a balloon of appropriate size before the stent is deployed to enable it to expand to its intended size. In some stents, auto expansion must be assisted with 'post-dilatation' for full expansion of the stent to occur.

Commonly used self-expanding stents are braided stents, or laser cut stents. A braided stent is a metal stent that is produced by what is called a plain weaving technique. It is composed of a hollow body, which can stretch in the longitudinal direction and whose jacket is a braid made up of a multiplicity of filament-like elements which, in the expanded state of the braided stent, intersects a plane perpendicular to the longitudinal direction at a braid angle. Laser cut stents are constructed from a tube of material (most frequently, nitinol, a nickel titanium alloy), and stainless steel, cobalt, etc. that is laser-cut during production to create a meshed device. The tube is comprised of sequential aligned annular rings that are interconnected in a helical fashion. The tube is compressed and loaded into the delivery device and expands to its original size when released. Nitinol, which has thermal memory, may help stents made of this material expand into position when exposed to body temperature after delivery. Compared with self-expanding braided stents, laser cut stents provide more accurate stent deployment with less foreshortening. Laser cut stents are much less subject to foreshortening but are probably less rigid than braided stents.

The stent, after expansion, is intended to restore the occluded vessel to normal or near normal flow conditions in the stented area. In the arterial and venous system, the stented area should have smooth laminar blood flow of uniform velocity. To help avoid restenosis, or the depositing of material in the stented vein, and the resultant re-occurrence of an occlusion, maintaining adequate flow through the stent is desirable. Unfortunately, existing stents do not provide such. A better stent product is needed. Some stents include a sleeve or a flexible non-elastic sleeve (a graft) that covers the stent. The sleeve or graft presents over expansion of the stent, such as can occur in an aneurysm. The sleeve is generally fluid tight in most applications or may be wrapped with a hemostatic agent, and also provides a path for blood flow in an aneurysm. In other applications a graft can be permeable, such as an eTeflon graft.

Venous grafts or fistulas are tubular members used to move blood from one part of the body to another; for instance, an AV graft or AF fistula used as a shunt or bridge, moving blood from the arterial system to the venous system, such as used in dialysis. A fistula employs natural materials, such as a harvested vein, for the tubular member. For a graft, synthetic non-elastomeric but flexible materials such as plastics (Dacron, polyesters, PVC, polyurethanes, PTFE (Polytetrafluoroethylene) or Teflon, or eTeflon) are used to form the tubes. Flow rates in these shunts and fistulas are important, as variable flow rates can cause problems in the procedure using the graft. Grafts are used in multiple procedures, such as dialysis. It is desired to have a graft that has improved flow properties, such as constant conductance flow along the length of the graft, for greater flow rates than those present in uniform diameter grafts which exist in the prior art. Grafts can also be used on the exterior of a stent to limit the expansion of a stent.

SUMMARY OF THE INVENTION

The invention includes grafts whose radius grows monotonically along the length of the graft. It is preferred that the radius r grows with length L, so that $r^4/L$ remains constant. The invention includes grafts that have a portion where the radius grows so that $r^n/L$ remains constant, where $n \geq 4$.

The invention includes grafts that grow piecewise linear; for instance, a graft can have a setoff radii $r_i$ along the length at positions Li, where each radius and associated length is such that $r_i^n/Li$ is a constant, where $n \geq 4$ and the radius between sequential $r_i$ grows linearly with length. The grafts can include fitted radial plastic rigid rings at various positions along the length to maintain the shape of the graft. This piecewise growth can also be an approximation of $r^n$ growth with length.

The invention includes graft to cover a stent, where the graft contains a portion that has increased flow or "unitary," or constant conductance flow, where the radius r of the portion expands with the length l so that so that $r^4/l$ remains constant in the portion, or near constant conductance flow, where the graft radius expands with the length of the portion of the stent it covers, so that $r^n/l$, remains constant, where n>4, in the near constant conductance portion.

BRIEF DESCRIPTION OF THE DRAWINGS

FIG. 4A-1 is a side perspective view of a constant conductance flow stent of length 16.0 cm with initial diameter of 10 mm, indicating the radius of the stent at 1 cm intervals along the stent.

FIG. 4A-2 is a side perspective view of a constant conductance flow stent of length 15.0 cm with initial diameter of 10 mm, indicating the radius of the stent at 1 cm intervals along the stent.

FIG. 4B-1 is a side perspective view of a constant conductance flow stent of length 16.0 cm with initial diameter of 12 mm, indicating the radius of the stent at 1 cm intervals along the stent.

FIG. 4B-2 is a side perspective view of a constant conductance flow stent of length 15.0 cm with initial diameter of 12 mm, indicating the radius of the stent at 1 cm intervals along the stent.

FIG. 5A is table for a constant conductance flow stent of starting diameter 1 cm, showing the change of radius with length L of the stent and showing the constant geometric factor of $R^4/L$ along the length L of the stent.

FIG. 5B is table for a constant conductance flow stent of starting diameter 1.2 cm, showing the change of radius with length L of the stent and showing the constant geometric factor of $R^4/L$ along the length L of the stent.

FIG. 6A-1 is an Excel spreadsheet for a constant conductance flow stent of initial radius 0.5 mm (diameter of 1 mm) depicting the variation in radius and diameter in 1 cm intervals and showing the constant geometric factor.

FIG. 6A-2 is an Excel spreadsheet for a constant conductance flow stent of initial radius of 1 mm (diameter of 2 mm) depicting the variation in radius and diameter in 1 cm intervals and showing the constant geometric factor.

FIG. 6A-3 is an Excel spreadsheet for a constant conductance flow stent of initial radius of 2 mm (diameter of 4 mm) depicting the variation in radius and diameter in 1 cm intervals and showing the constant geometric factor.

FIG. 6A-4 is an Excel spreadsheet for a constant conductance flow stent of initial radius of 4 mm (diameter of 8 mm) depicting the variation in radius and diameter in 1 cm intervals and showing the constant geometric factor.

FIG. 6A-5 is an Excel spreadsheet for a constant conductance flow stent of initial radius of 16 mm (diameter of 32 mm) depicting the variation in radius and diameter in 1 cm intervals and showing the constant geometric factor.

FIG. 7C-1 shows a side perspective view of an 8 cm long constant conductance flow stent of initial diameter of 10 mm.

FIG. 7C-2 shows a side perspective view of a 7 cm long constant conductance flow stent of initial diameter of 32 mm.

FIG. 7D-1 shows a perspective view of a constant conductance flow balloon that has a portion matching the characteristics of the stent of FIG. 7C-1.

FIG. 7D-2 shows a perspective view of a constant conductance flow balloon that has a portion matching the characteristics of the stent of FIG. 7C-2.

FIG. 12-1 shows a perspective view of a near constant conductance flow segmented stent built using five Z stents. Each Z stent segment is 1 cm long. The initial and ending diameter of each segment are a diameter that would be appropriate for a constant conductance flow stent over that 1 cm segment, where the radius of the initial segment is 0.845 cm. The growth of each Z stent segment is not necessarily "constant conductance," but can be linear as is shown.

FIG. 12-2 shows a constant flow-like segmented stent built using five Z stents. Each Z stent segment is 1 cm long. The initial and ending diameter of each segment are a diameter that would be appropriate for a constant conductance flow stent over that 1 cm segment, where the radius of the initial segment is 0.672 cm.

FIG. 12-3 shows a near constant conductance like segmented stent built using five Z stents. Each Z stent segment is 1 cm long. The initial and ending diameter of each segment are a diameter that would be appropriate for a constant conductance flow stent over that 1 cm segment, where the radius of the initial segment is 0.351 cm.

DETAILED DESCRIPTION OF PREFERRED EMBODIMENTS OF THE INVENTION

Figure 1:
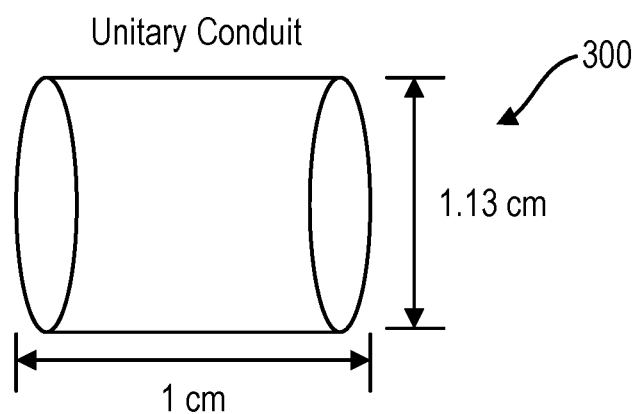
FIG. 1 is a side perspective view of an embodiment of a 1 cm unitary stent with the relevant flow equations showing flow through this embodiment.

Venous system blood flow and other fluid flows are normally modeled with Poiseuille law, and hydrodynamic relationships, including the expression between flow, pressure, and resistance. The unitary conduit, or increased flow conduit, or constant conductance flow conduit concept described here and in FIG. 1 is particularly important in venous flow where pressure heads are very low. In certain arterial stenosis that are multiple or diffuse, the unitary conduit principles may be important as well. In small conduits such as coronaries, and small veins, thrombosis of the stent is a risk if flow falls below a certain critical level. The unitary or constant conductance flow conduit may perform better under these conditions. The relevant flow equations are as follows:

Poiseuille equation, Volumetric Fluid flow, $Q=\Delta P/R$ where $1/R$ is known as the conductance and where $R=8\mu L/\pi r^4$ and where $\mu$ is the fluid viscosity Rearranging, and combining the two equations:

$$Q=\Delta P*(\pi/8)*(r^4/L)*(1/\mu).$$

where L represents the length of the cylinder (stent) (measured from the start of the stent), the last three terms represent the numeric, geometric or growth and viscosity factors respectively. Q, or volumetric fluid flow (m³/sec) or flow, which in the venous system, is generally measured in ml/sec or liters/min. In low pressure areas of the arterial system, these relationships can also be used for modeling flow. For instance, we constructed a "unitary" conduit with an initial diameter of 11.2 mm with an initial section of 1 cm of constant radius and expanding to an end diameter of 17.7 mm at a length of 6 cm. The radius expanded with length l so that $r^4/l=(0.56)^4$. We compared fluid flow through the unitary conduit to a second uniform diameter or non-unitary conduit. A total of 4.5 liters was run through each conduit with a head pressure of 25 mm Hg. The time taken to empty the 4.5l from the reservoir is shown in Table 1 below.

TABLE 1

| Trial | Non-Unitary Uniform Conduit Time (seconds) | Trial | Unitary Conduit Time (seconds) |
|---|---|---|---|
| 1 | 64 | 1 | 43 |
| 2 | 64 | 2 | 41 |
| 3 | 66 | 3 | 44 |
| 4 | 68 | 4 | 45 |
| 5 | 68 | 5 | 45 |
| Average Time | 66 | Average Time | 43.6 |
| Average Flowrate | 68 mL/sec | Average Flowrate | 103 mL/sec |

Thus, the flow rate for the increased flow or unitary conduit was 103 mL/sec and was 68 mL/sec (averaged) for the non-unitary or uniform conduit (constant diameter). As can be seen, errors in the stent radius can have significant consequences on blood or fluid flow.

Figure 2:
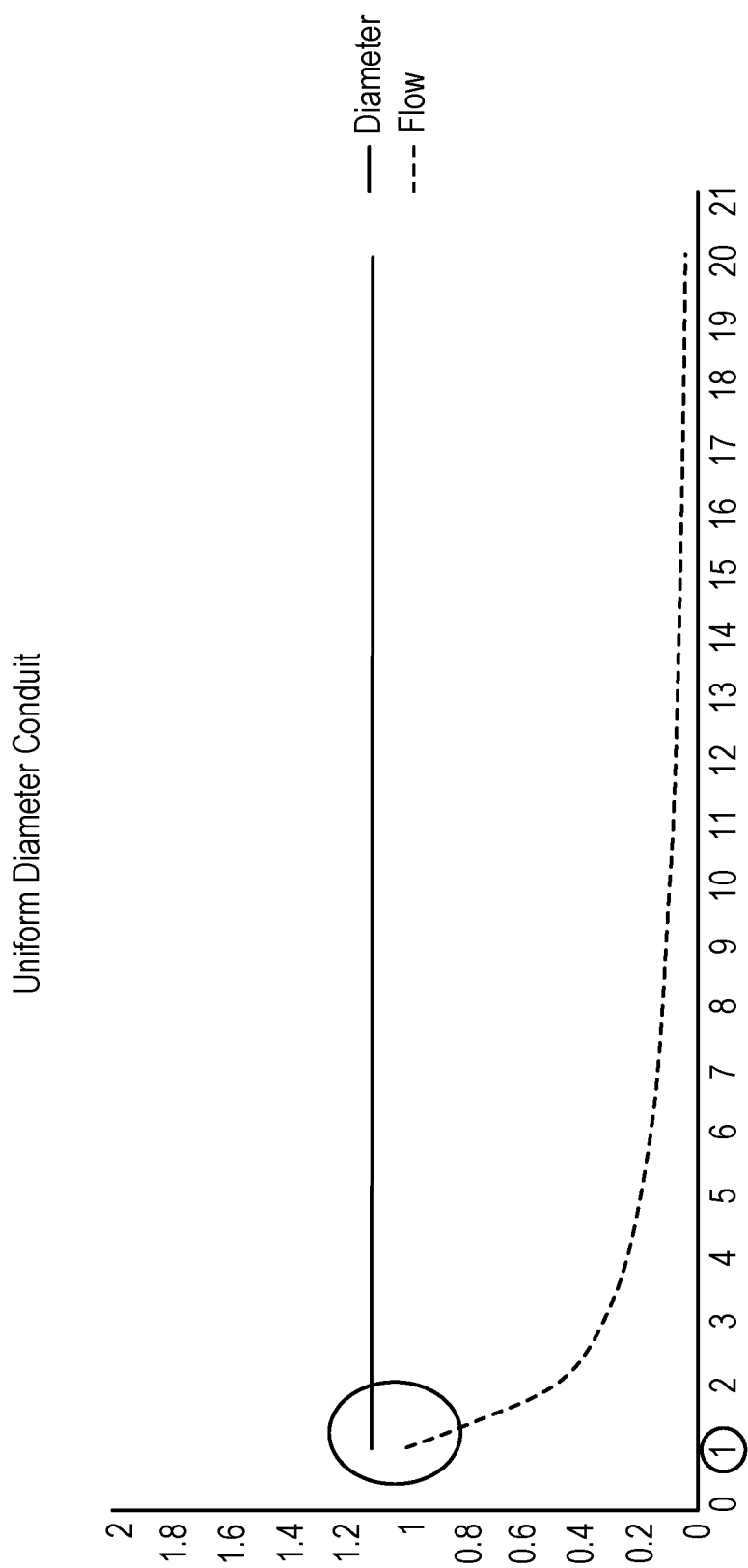
FIG. 2 is a graph showing decline in flow with length through conduits of uniform diameter.
Figure 3A:
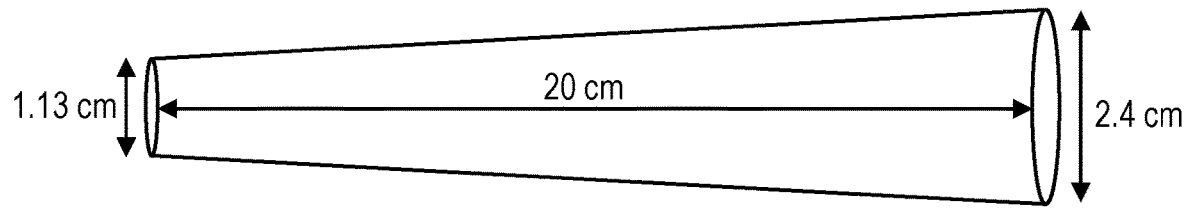
FIG. 3A shows one embodiment of the invention with a 20 cm length and a starting diameter of 1.13 cm.
Figure 3B:
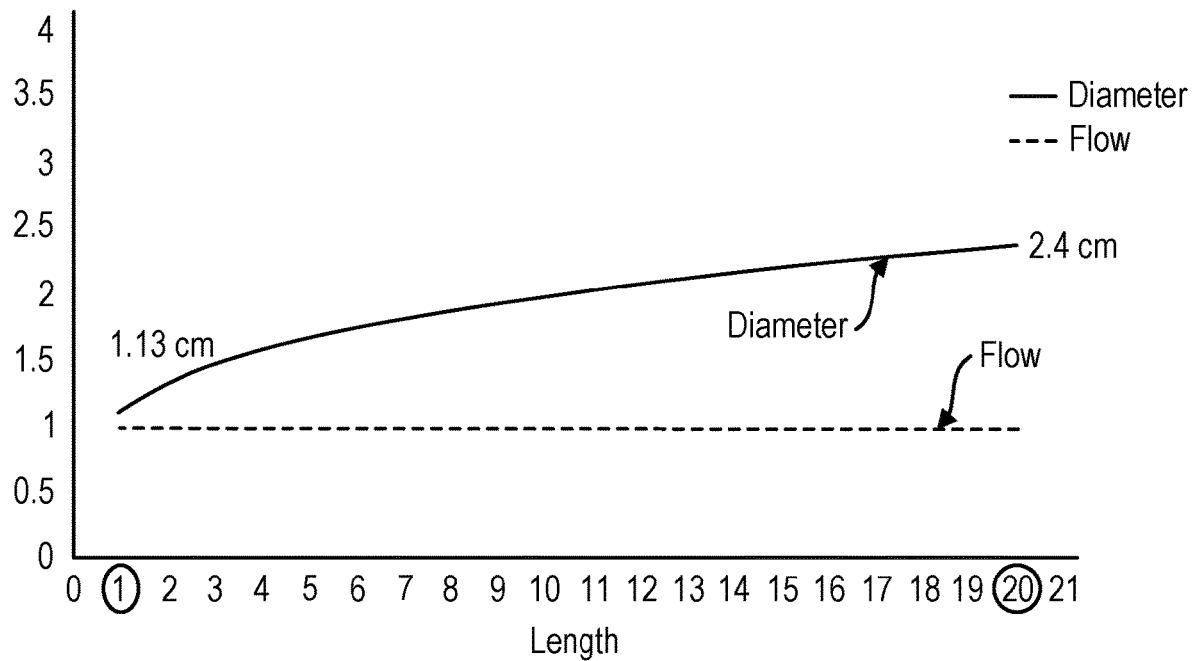
FIG. 3B is a graph of diameter versus flow through the unitary stent of FIG. 3A.
Figure 7A:
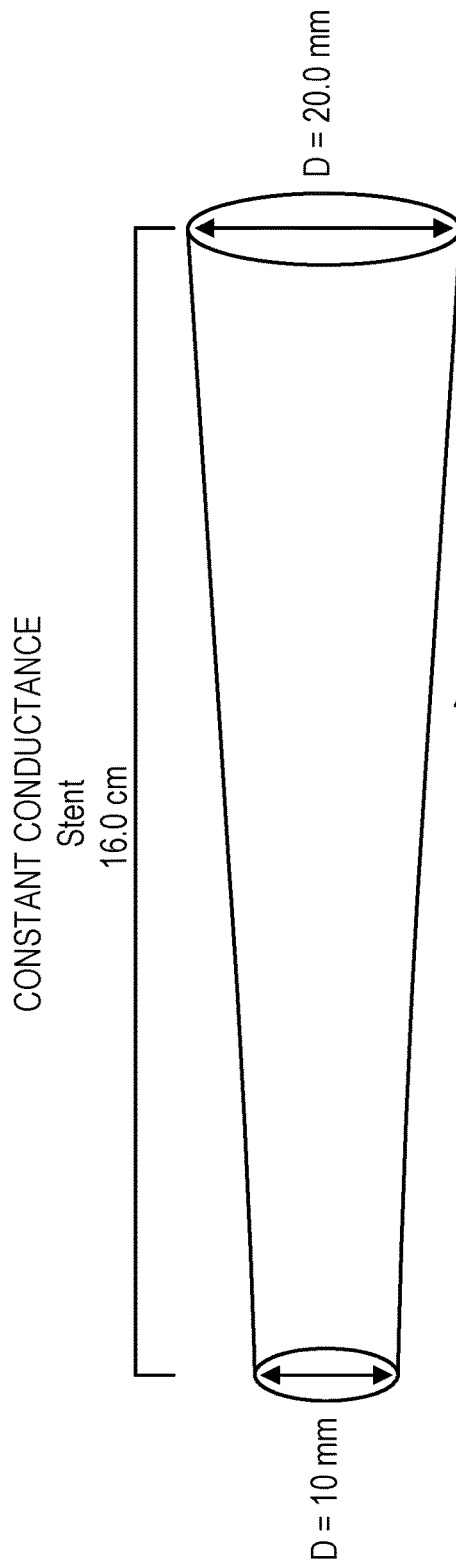
FIG. 7A is a side perspective view of a constant conductance flow stent with initial diameter of 10 mm, with a length of 16 cm.
Figure 7B:
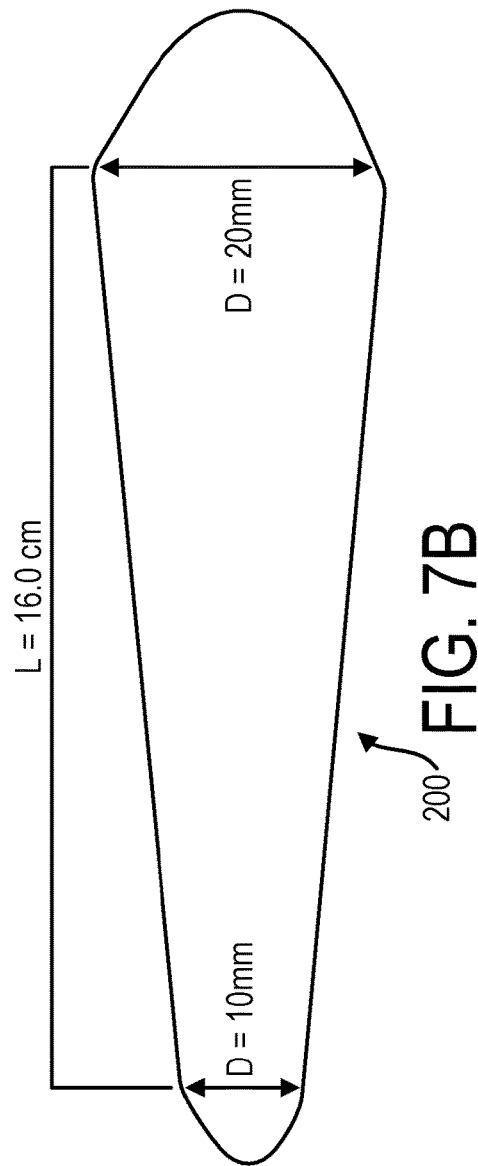
FIG. 7B shows a constant conductance flow balloon where a 16 cm portion of the balloon matches the constant conductance flow stent characteristics of the stent of FIG. 7A.

The flow equations can be simplified further by inserting known values for $\pi$ and $\mu$ (the viscosity of blood). Other fluid viscosities could be used, depending on the application. As shown in FIG. 1, for a unitary conduit 300 of 1 cm in length with a diameter of 11.3 mm, the formula further reduces to: $Q=\Delta P*1=\Delta P$. Such a "unitary conduit" will have a constant conductance of exactly 1, allowing flow to be directly proportional to the pressure head. However, if the conduit is extended beyond 1 cm, (with constant radius), the flow will decline, as increasing length in the denominator will reduce conductance and flow will be reduced under a constant pressure head (see FIG. 2). This reduction in flow can be partially compensated for by increasing the radius slightly with the length (that is, r is a function of L and is not constant), to maintain a constant geometric factor $r^4/L$, and hence, constant conductance. In the constant conductance section, the flow is directly proportional to the pressure head $\Delta P$. A relatively small increase in radius with length is needed as conduit radius (r) enters the equation in the fourth power in the numerator, while the length (L) is the denominator in the first power. See FIG. 3A. A conduit or stent or graft that expands the radius with length so that $r^4/L$ remains constant is called a "unitary" or constant conductance flow stent, herein, having increased flow characteristics. As shown in FIG. 3B, the flow in a constant conductance stent or raft is almost constant. For this reason, a constant conductance stent may be referred to as a constant flow stent herein. The concept is to keep the conductance or flow constant in the stent or graft, which can be achieved by maintaining the geometric factor ($r^4/L$) a constant value K in the stent. In these instances, the radius grows with the length of the stent or graft, and as used herein R4 growth means $r=K*(\sqrt[4]{L})$, or ($r^4/L=k$, where K is a constant. All examples used herein will have the stent or graft grow after the first 1 cm of length, where the first cm preferably has a constant radius, thus avoiding the ambiguity of examining $r^4/L$ as $L\rightarrow 0$.

In reality, a stent, or graft starts in an existing conduit in a pressure driven with existing Q. That implies that the initial conduit combination can be viewed as a single conduit. To determine the "effective length" of that portion of the conduit before the onset of the stent or graft, we have $L=(\Delta P r^4*\pi)/(Q*8*\mu)=L_{EFF}$, the effective length). Consequently, the combined "conduit" at the beginning of the stent has a length, and the length of the stent or graft will never be zero. Use of a 1 cm starting length is arbitrary, but not unreasonable, as the measured Q (such as estimated from doppler sonar), and $\Delta P$, within biological systems other than arterial, should be small, so L will not be very large. Hence, using a 1 cm constant diameter starting stent or graft is not unreasonable, as it is unlikely to changes L significantly. Alternatively, the diameter for a specific length to start R4 growth can be chosen, as well as the stent starting diameter for R4 growth after the specific length; then providing for a smooth transition from the starting radius to the radius at the start of R4 growth (such as a linear transition) can be selected.

The preferred constant value will be $ri^4/(L)$ where ri is the starting radius of the unitary or growth or section L, as described above is the length of the conduit measured from the beginning of the stent or graft, and as used in the examples herein, is set as 1 cm, the actual stent length at the start of the growth section in the examples. If the expanding portion of the stent starts at length LSO, with radius ri at this length, the constant K will be $ri^4/(LSO)$.

As an example, consider a graft having a diameter of 18 mm (9 mm radius) with a starting length of 1 cm with a constant radius graft, then at the start of the constant conductance flow (at length 1), $r^4/L=(1.8/2)^4/1=0.6561=K$. This number K will be used as the constant K or constant value used in the reminder of the graft. that is, $r^4/L=(1.8/2)^4/1=0.6561$ in the remainder of the graft. Consequently, for a 2 cm long graft, the terminating radius would be $(0.6561*2)^{0.25}=1.070$ cm or a diameter of 21.4 mm. A 3 cm long graft would have a terminating radius of $(0.6561*3)^{0.25}=1.18$, cm, or diameter of 23.6 mm; a 4 cm long graft would have an ending radius of 12.7 cm, or a diameter of 254 mm; and for a graft length of 5 cm, the terminating radius would be 13.45 cm, or a diameter of 257 mm (an overall increase in cross-sectional area of about 123.3% $(1.34/0.9)*2$.

If the expansion section starts at the beginning of the stent or graft (here measured graft or stent or conduit length=0), then LSO is a value greater than zero, preferably ($L_{eff}$), as described above. If the growth section is near or the beginning of the stent, then the preferred constant value will be $ri^4/(L_{eff}+LSO)$ where $L_{eff}$ is described above, and LSO is the actual non-zero measured length of the conduit at the start of the growth. This shows the power of expanding the radius of the conduit. Such a graft or stent or graft, of constant conductance flow (e.g., $r^4/l=constant=K$). Such $r^4/l$ growth will be referred to as a unitary graft or stent or a constant conductance flow graft or stent.

Figure 1A:
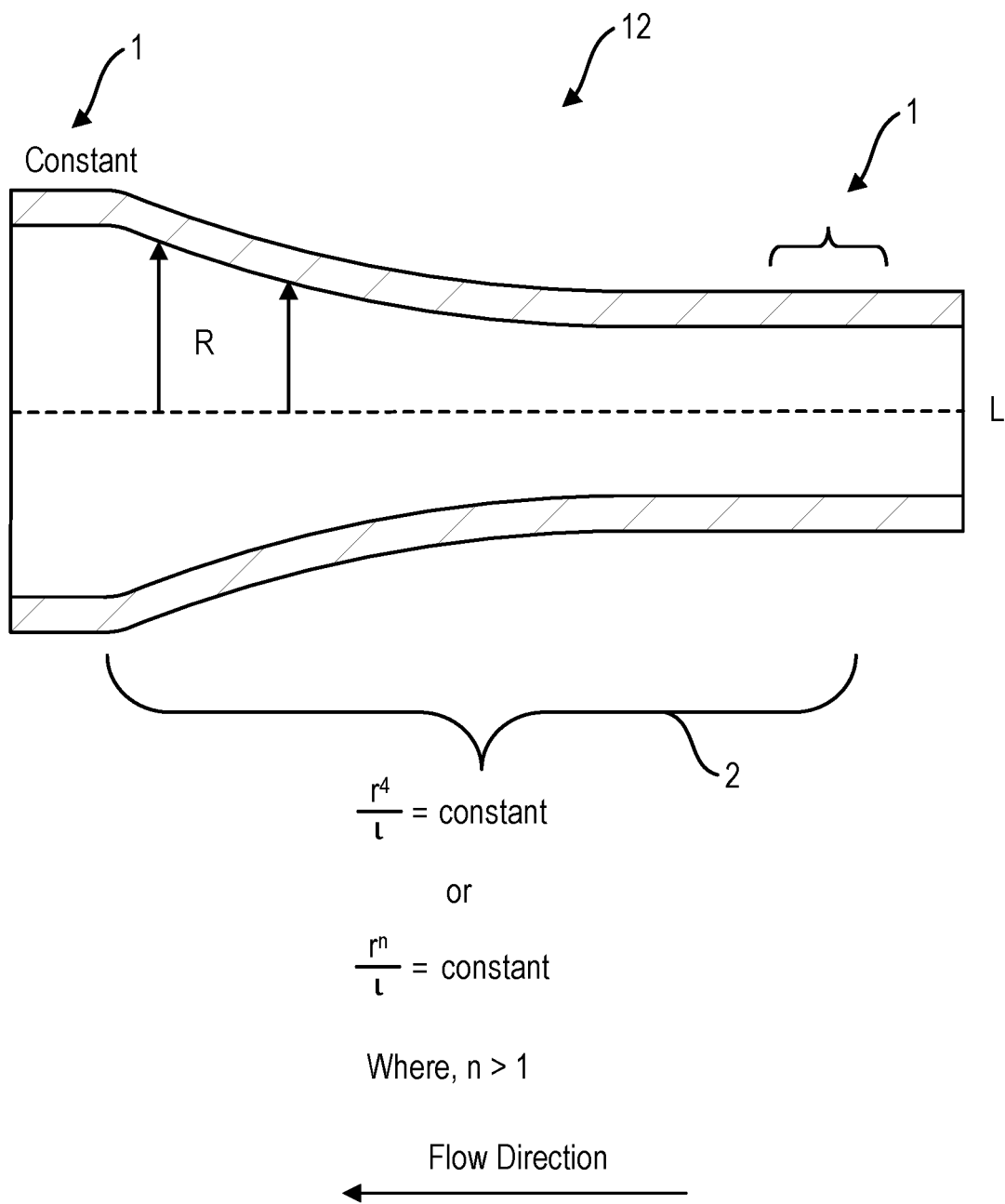
FIG. 1A is a cross section through a graft where the radius r grows with length L so that $r^n/L$ is a constant.

A constant conductance flow graft or stent is particularly useful in grafts or stents that are short in length, typically 20 cm or less. Initial diameters of 6 mm to 14 mm are typically useful in some applications. An example is shown in FIG. 1A, which depicts a lengthwise cross section through a graft 12 that starts and ends with sections 1 of constant radius, but grows with $r^n/l$ constant in the section 2 therebetween, where $n \geq 4$.

Some uses for grafts follow:

Dialysis Grafts

Too much flow or too little flow is a problem with grafts in the standard configuration of a uniform diameter graft. Too much flow may result in heart failure, putting too much load on the heart. Too little flow may not clear creatinine, urea, and other substances during dialysis, requiring longer dialysis times or more frequent dialysis. Too little flow also may result in graft thrombosis, a major problem with dialysis grafts at the present time. This requires surgery or interventions to reopen the graft and may ultimately lead to need for a new graft. Some patients run out of places where you can put such grafts in (you need a good artery and vein)—sometimes an indirect cause of fatality.

A low flow situation is suspected to cause a proliferation of fibrous tissue at the site of graft-vein anastomosis in some patients. This proliferation is similar to ISR and is suspected to be the cause of dialysis graft thrombosis in over 80% of the occurrences. A graft can be used as the fed to the hemodialysis machine, for the return from the hemodialysis machine, or both.

Artificial Auxiliary Arterio-Venous Fistula or an Arterio-Venous Graft

These surgically created artificial fistula are used to increase flow to keep a venous section, bypass, or graft open. Typically, they are used when inflow into a bypass (e.g., Palma femoro-femoral venous bypass) or graft (e.g., iliac vein graft with poor inflow) is considered poor. The A-V fistula may also be used after clearing a clot from a vein (thrombectomy) or scar tissue from a post-thrombotic vein (endophlebectomy). The fistula is meant to be temporary and is closed after a period of 6 weeks or so Like dialysis grafts, the A-V flow can cause heart failure, but a more common problem is venous hypertension—increased venous pressure in the leg, the correction of which is often the original goal of the primary operation. Using an increased flow graft with a higher rate of flow in the above situations will help prevent thrombosis which may occur from low flow. The variability of flow is worsened where the length of the graft is set by the surgeon, possibly shortening the graft by cutting as desired. A change in graft length creates a change in flow delivered by the graft.

Venous or Arterial Grafts with Poor Inflow or High Rate of Thrombosis

While arterial grafts enjoy high pressure inflow, venous grafts do not because venous pressure is naturally lower. A constant conductance flow graft makes sense in order to preserve the pressure energy from degrading by use of the standard configuration grafts. Examples of such grafts include porta-caval, mesenteric-caval, axillary subclavian, femoro-femoral, femoro-iliac and iliac-caval venous bypasses and coronary artery bypasses.

The constant conductance flow grafts may also be useful in short length arterial bypasses where no venous substitute is available. A constant conductance flow graft will also be useful in arterial-arterial grafts where the "run off" or the downstream bed that it flows into is poor.

Grafts with Support

Grafts with rigid skeleton support, such as formed by placing rigid or semi-rigid plastic rings spaced along the graft length and glued to the graft exterior or interior, are useful as endoprosthesis. After deployment, the resident vessel assumes the standard configuration of these devices. They are usually deployed in distressed situations where flow is problematic, and the chance of thrombosis is high. A constant conductance flow configuration makes better sense in these locations.

One such example is a TIPS (trans jugular intrahepatic porta-systemic) shunt performed for portal hypertensions. The device used has a high thrombosis rate from low operating pressures. Using a constant conductance flow graft, employing external rings whose diameter also varies with position, would improve patency.

Stent Grafts or Sleeved Stents

A stent graft is a flexible non-elastic or non elastomeric sleeve that covers the exterior of a stent. The graft limits the expansion of the stent it covers. The stent will thus assume the shape of the graft, and the shape of the graft can vary with the length of the stent. Stent grafts are used in venous systems, and also in arterial systems to treat aneurysms.

A conduit extending from the common femoral vein to the inferior vena c ava was modeled in FIGS. 4A and 4B. It would have a continuously gradually increasing radius (r) to maintain the conductance constant. In FIGS. 4A and 4B, two lengths are depicted, 15 and 16 cm, each for two starting diameters at 10 mm (FIG. 4A) and 12 mm (FIG. 4B) respectively. FIG. 5 is a unitary or constant conductance diameter table for two starting diameters (10 and 12 mm), starting at station #0, the start of the conduit, and increasing in length at 1 cm intervals while progressively increasing in diameter after station 1 (i.e., a constant starting diameter of 1 cm), keeping $r^4/l$ constant=(starting diameter/2)$^4$/1. Additional tables with different starting diameters and lengths can be constructed using the calculation method described. FIGS. 6A-1 through 6A-5 are Excel spreadsheets showing dimensions for smaller sized conduit diameters (starting diameters 1, 2, 4, 8, 16, 32 mm) with stent ending radius depicted for "unitary" or constant conductance conduits for various lengths (for instance, 1 cm to 30 cm length). Similarly, FIG. 5A shows similar results for conduits starting at 1 cm diameter and the corresponding ending radius for various length conduits (1 to 20 cm). The concept is useful in constructing stents of various diameters and lengths that grow in diameter with length.

These tables can be used not only for designing "unitary" or constant conductance flow or increased flow stents and grafts but also for designing/constructing "unitary" balloons of the same diameter/length proportions, where balloon expansion is not uniform but expands non-uniformly, to approximate the unitary stent to be deployed, to match the balloon with the stent. To accomplish this, the balloon thickness can be varied, and/or the balloon materials can be varied with length. Alternatively, the balloon can be encased in a non-elastic unity shaped sleeve, so that when the balloon is expanded, it is restrained by the sleeve into the desired unitary form. Additionally, a non-uniform expanding balloon, such as a "unitary balloon" can be used for angioplasty without stenting, or for pre-dilatation of a stenosis before deploying a unitary or constant conductance stent 100 such as the stents 100, 101, 102 shown in FIGS. 7A and 7C-1 to 7C-2, and the corresponding balloons 200, 201 202 shown in FIGS. 7B and 7D-1 to 7D-2. The balloon of corresponding size can be used for deploying balloon expandable stents as well. Under dilatation and over dilatation of a unitary stent is possible by employing slightly smaller or larger balloons or sleeves chosen, using the tables shown, or as calculated.

Figure 8:
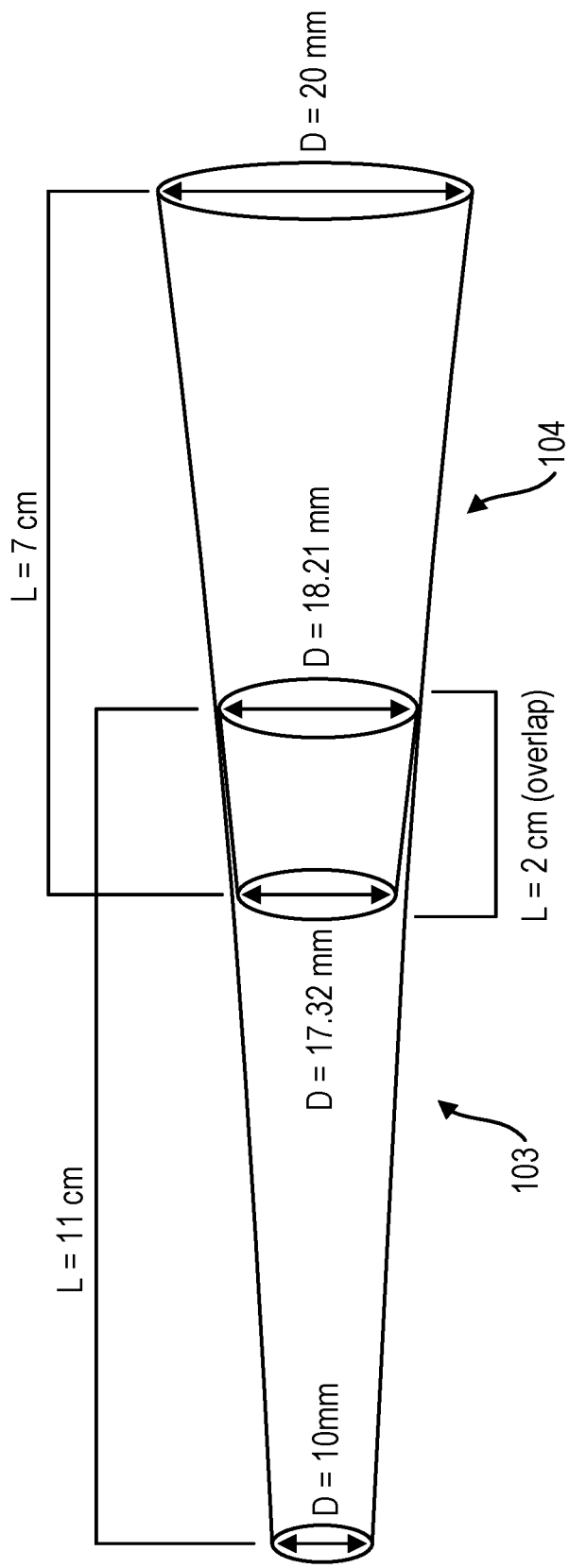
FIG. 8 is a perspective view of two stents to be inserted in line with a 2 cm overlap. The characteristics of these two stents are indicated.
Figure 9:
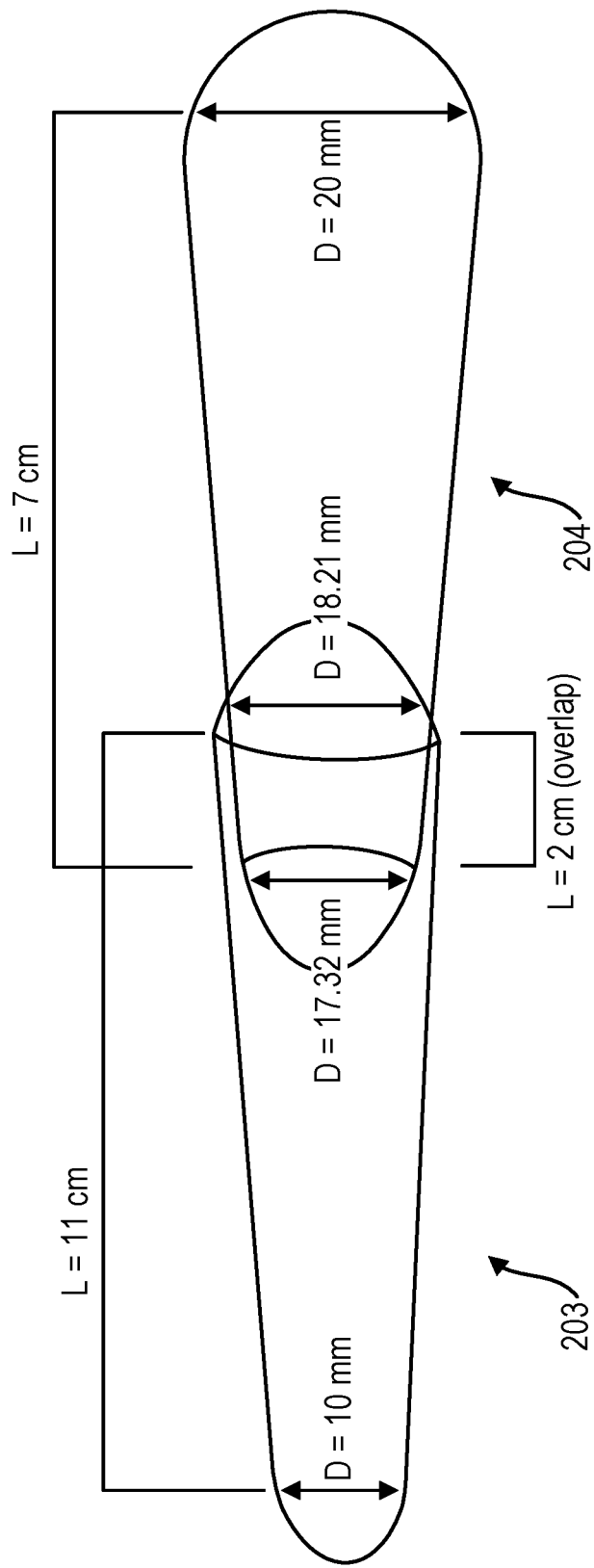
FIG. 9 shows a perspective view of two constant conductance flow balloons to be used with the constant conductance flow stents of FIG. 8. The intended overlap of the balloons when used in sequence is shown.
Figure 10:
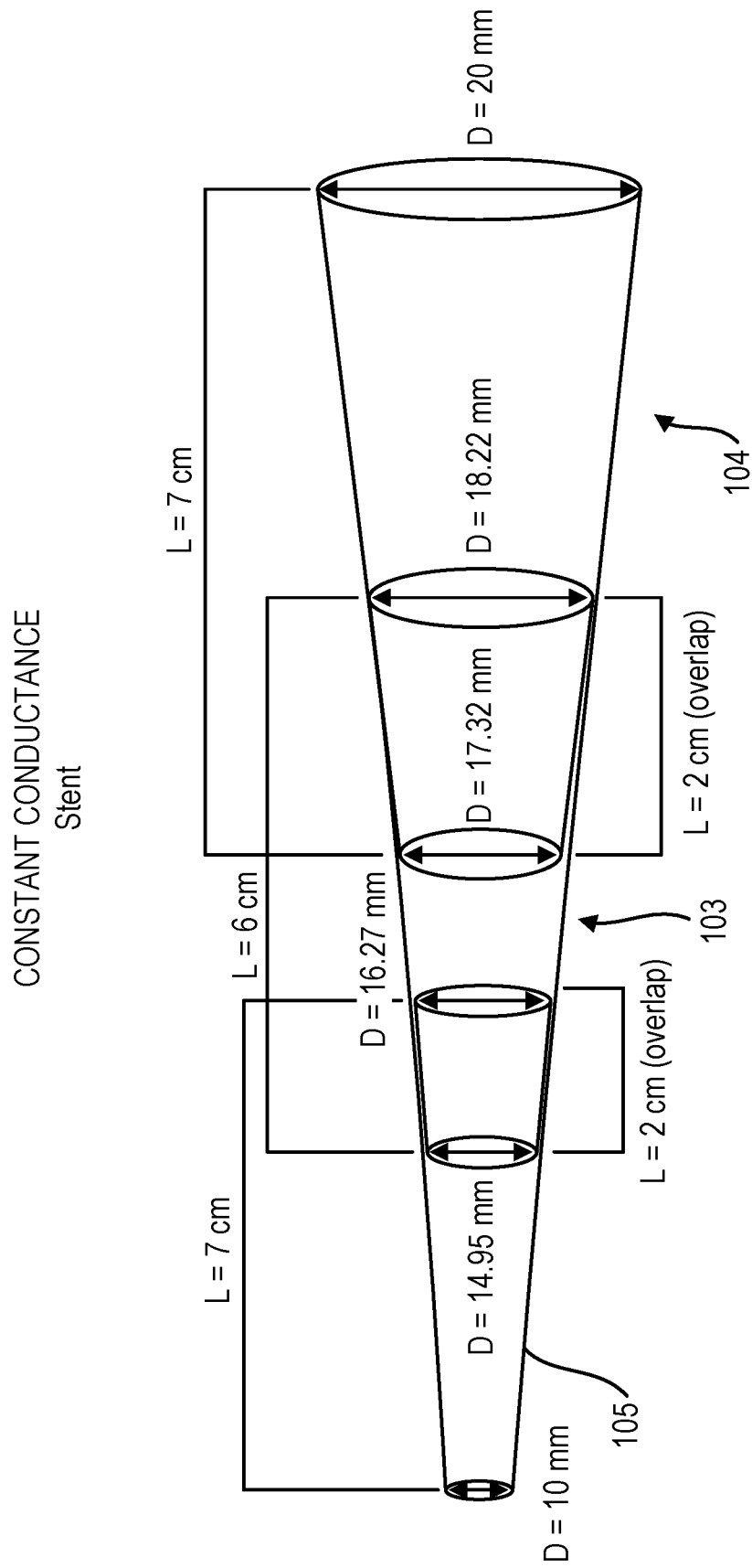
FIG. 10 is a perspective view of three stents to be inserted in line with a respective 2 cm overlap between adjacent stents. The characteristics of these three stents are indicated.
Figure 11:
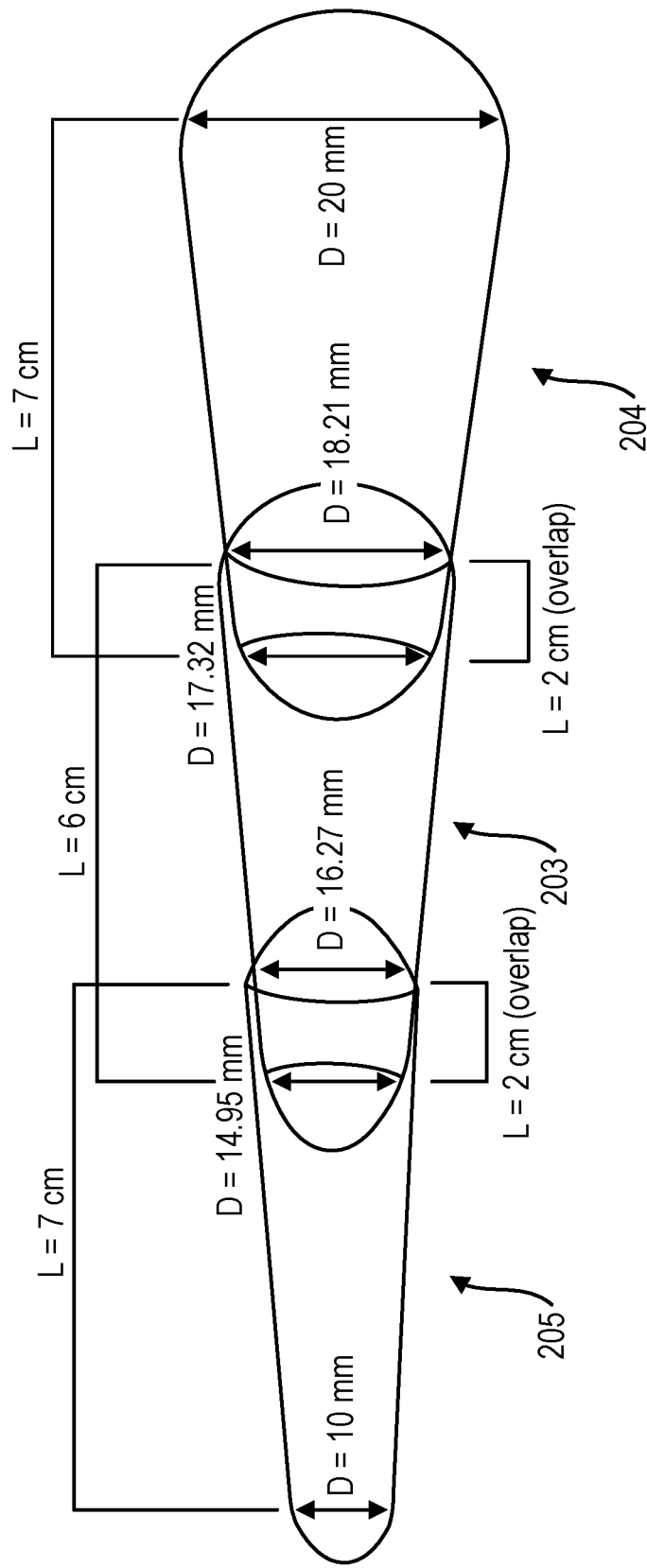
FIG. 11 shows a perspective view of three constant conductance flow balloons to be used with the constant conductance flow stents of FIG. 10. The intended overlap of the balloons when used in sequence is shown.

When shorter length balloons and stents are used, there should be some provision for overlap if the segment to be treated is longer than the length of a chosen balloon or stent. For instance, a 2.0 cm length stent overlap is shown in FIGS. 8 and 10, with the corresponding balloons shown in FIGS. 9 and 11. Longer or shorter overlaps can be chosen according to the tables and spreadsheets. FIGS. 10 and 11 show a similar depiction for three overlapping stents 105, 103, 104 and overlapping balloons 205, 203, 204 with 2 cm of overlap at each overlapping position. For the overlapped stent, it would start of length Le−2 where Le is the ending length of the first stent. The initial stent would have a radius RI at this point that matches the first stent radius at Le−2. Hence the overlapped stent would have an initial radius of RI and expand at R4 from this point (assuming the initial stent was R4 growth to its end), where L in the second stent is measured from the start of the first stent (as the overlapped stents emulate a single long stent). The radius in the second stent expands so that $r^4/L$=constant=(RI)$^4$/(Le−2) where L is preferably measured for the start of the first stent. This provides for continuous R4 growth for stacked stents. Note, if a stent has a second expanding portion starting at length Le (measured from the stent start) with radius re, with growth factor RM, the constant in that portion will be (re)$^m$/Le.

The R4 geometric scaling factor (e.g., $r^4/L$) can be illustrated in the following example: a parent vein receiving two tributaries, each 10 mm in diameter, will need to be only 12 mm in diameter (20% larger than each tributary) to maintain pressure unchanged even though the flow has doubled (FIG. 7). Zamir has calculated that doubling the radius of the conduit will reduce the energy needed to pump the same amount of fluid by 94% i.e., a mere 6% of the prior energy will do the same job. The venous system naturally grows as it gets closer to the heart.

Design and Use of Unitary or Constant Conductance Flow Stent/Graft Concept

The unitary or constant conductance flow stent and graft concept is applicable in the venous system, and in some circumstances, the arterial system, and other biological fluid systems. The concept is to keep the conductance or flow approximately constant in the stent, or graft for portions of either, which can be achieved by maintaining the geometric factor ($r^4/L$) as a constant K in the growth portion of the stent or graft. All examples used herein will have the conduit grow after the first cm of length, with constant radius for that first cm, thus avoiding the ambiguity of examining $r^4/L$ as L→0.

As an example, consider a stent having a diameter of 18 mm (9 mm radius) (a common stent diameter used in the common iliac vein) at the end of a 1 cm length of constant radius, then $r^4/L=(1.8/2)^4/1=0.6561$, the constant K used for the remainder of this stent. Consequently, for a 2 cm long stent, the terminating radius would be $(0.6561*2)^{0.25}=1.070$ or a diameter of 2.14 mm. A 3 cm long stent would have a terminating radius of $(0.6561*3)^{0.25}=1.18$, or diameter of 2.36 mm; a 4 cm long stent would have radius of 12.7 mm, or a diameter of 25.4 mm; and for a stent length of 5 cm, the terminating radius would be 13.45 mm, or a diameter of 25.7 mm (an overall increase in cross-sectional area of about 123.3% (1.34/0.9)**2 (the iliac vein has been shown to tolerate as large as 24 mm diameter stent sizes).

As used herein, the "downstream" end of the stent or graft is larger in diameter. The downstream direction of flow in the venous system is closer to the heart. Alternatively, downstream is the lower pressure end of the graft or stent. Downstream in the venous system is closer to the heart; in the arterial system, downstream is further from the heart. The "downstream" direction of the graft or stent is the direction that increases in radius, and represents fluid flow direction, downstream in pressure driven system is lower pressure than upstream. This increase in diameter or radius with length will assist to maintain improved flow in the graft or stent, to prevent stent or graft malfunctions such as in-graft restenosis caused by ingrowth of clot/tissue which accumulates and lines the wall of the graft. In addition, as the graft or stent delivers constant conductance flow, the initial upstream end can be a smaller diameter than would be needed in a uniform diameter graft, as a smaller initial diameter constant conductance flow graft can produce the same flow at the outfall or downstream end as that of a uniform diameter graft. We have calculated the length necessary for various diameters in grafts or stents up to 5 cm length, in Table 2. The first cm in length of these conduits is of constant diameter.

This increase in diameter with length will assist to help offset flow reduction in the stent or graft, to prevent conduit malfunctions like in-stent restenosis caused by ingrowth of clot/tissue which accumulates and lines the wall of the stent.

TABLE 2

| Stent length | 1 cm | 2 cm | 3 cm | 4 cm | 5 cm |
|---|---|---|---|---|---|
| CIV | 16 | 19 | 21 | 22.6 | 23.9 |
| EIV | 14 | 16.6 | 18.4 | 19.8 | 20.9 |
| CFV | 12 | 14.3 | 15.8 | 17 | 17.9 |

(stent diameter in mm)

As described, for a lengthwise cross section though a stent or graft, the outer envelope preferably creases as a $4^{the}$ order or $r^4$ with length. Such an increase is not required but is preferred. Slower growth in the radius with length, such as achieved with $r^5/l$, $r^6/l$ or $r^7/l$ being constant, can also provide benefits similar to constant conductance flow, as the slower increase in radius still helps to offset slower flows present in a constant radius conduit. Faster growth of radius with length, and faster flow, such a where $4>n\geq 1$ (linear growth, or growth by $x^2$ or $x^3$ or a combination such as a second order polynomial or a third order polynomial) can also provide a benefit, as flow is further increased with R1, R2 or R3 growth, which can be useful in areas of the stent or graft where restenosis or growth might accumulate from deposits with slower flow.

Stent or Graft Growth with Length

Figure 12:
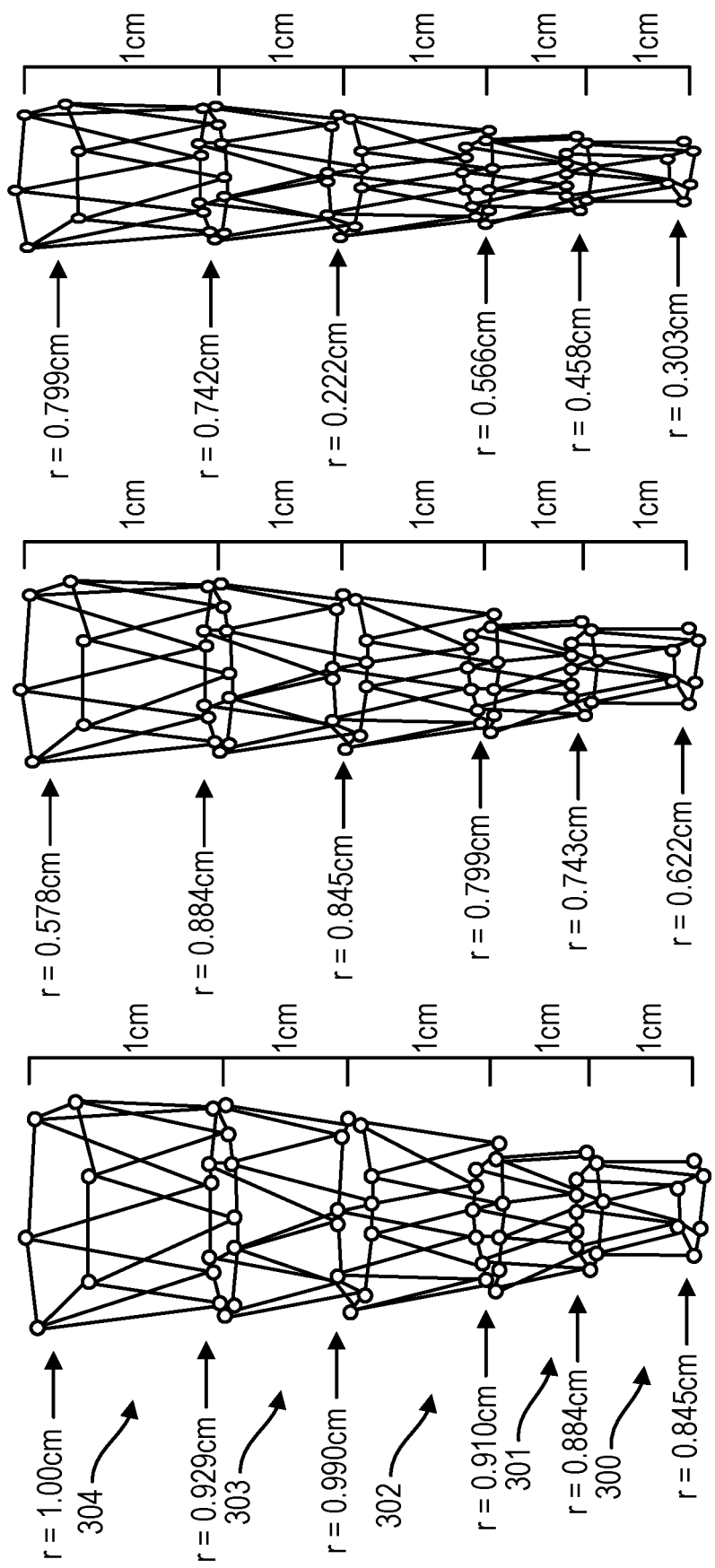

As long as the stent or graft radius grows with length over portions of the stent or graft, (preferably consistent growth over each portion and preferably monotonic growth overall in the stent or graft), such increased RN growth e.g., n>4, is considered "unitary like" growth or "near constant conductance flow herein, and within the scope of the invention. Flow as used herein is volumetric fluid velocity. Additionally, the stent's or graft's outer envelope may linearly increase between fixed stent or graft radii at specific lengths, where those radii represent $r^4$ or RN growth at those radii/length combinations. Connecting the RN radii with linear radius or other growth rates therebetween approximates RN growth in piecewise steps. Such a stepwise construction with linear growth between the RN radii is suitable for Z stents, such as the five Z stent 300, 301, 302, 303, 304 stacks shown in FIG. 12, as the Z stent diameter can be modified by changing the suture diameter at the top, middle or bottom of the Z stent stack, and is believed to make fabrication of a stepwise approximation to $r^4$ growth with Z stents (or other chosen growth factor) more efficient. Z stents and variations are described in U.S. Pat. Nos. 4,580,468; 5,282,824; 5,507, 771 and 8,043,357 (all incorporated by reference herein). The ending radius of each stent segment Si, at length Li (measured from the start of the stent) is preferably unitary; that is ri is chosen so that $ri^4/Li$ a constant value at each starting and ending radius of each segment. If the length of augment Si is li, then the total length of the growth portion up to the radius in question Li will be $Li=\Sigma li$, where the sum stops at the respective radius of the segment in question. For a unitary or R4 approximation, $ri^4/Li$ is equal to the same constant, $ro^4/Lo$, where ro is the radius at the start of the first growth section of the stent, and Lo is preferably (Leff) if the expansion section starts at the beginning of the stent, (L=0), or if the unitary growth section is near the beginning of the stent, then the preferred constant value will be $ri^4/(L_{eff}+LSO)$ where $L_{eff}$ is described above, and LSO is the length of the stent measured to the start of the unitary growth portion near the beginning of the stent or Lso is the initial length of the stent to the start of the growth section (For the examples herein, Lo is 1 cm and the radius is expressed in cm). While each starting and ending stent segment radius is unitary, the growth of the stent radius between may be either unitary or unitary like (near constant conductance growth) or linear. For instance, for the step segments in FIG. 12, each starting and ending segment radius is unitary, but the growth within each R4 segment radius is linear. The growth of each Z stent segment starting and ending radius can be unitary or other Rn growth (Rn or $r^n$ growth means $r^n/l$ is constant herein).

Figure 2A:
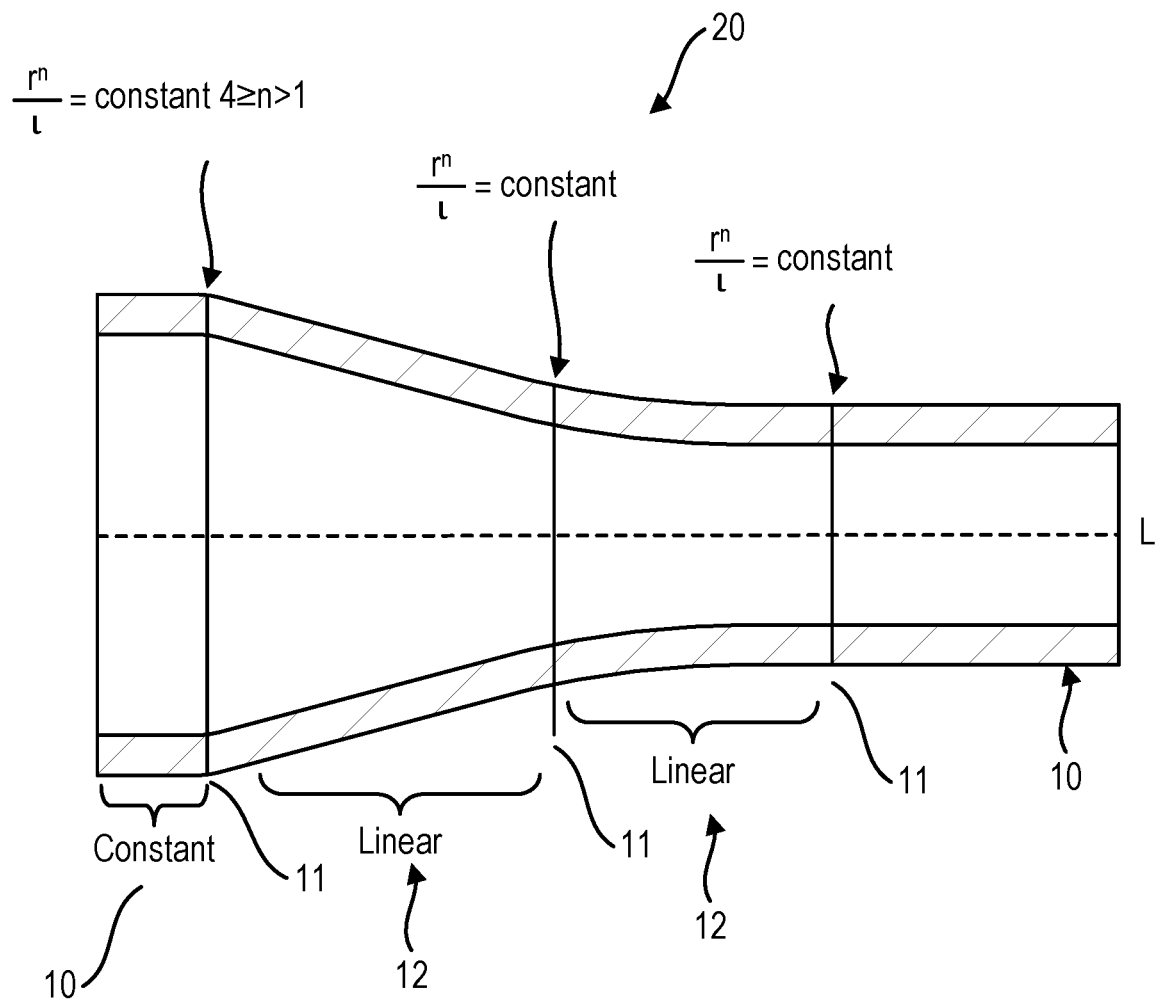
FIG. 2A is a cross section through a graft that has set radii that grow with length L so that $r^n/L$ is a constant, but r is linear with length therebetween.

Expansion with the chosen growth factor is depicted in FIG. 1A. FIG. 2A depicts a cross section through a graft, where the graft's outer envelope approximates R4 growth by having a series of lengths 11 along the graft (shown as three), where $r^4/l$ is constant. In between these lengths, the growth 12 can be linear. As shown, the ends of graft 10 have constant diameters sections. This piecewise growth is believed to make fabrication of a stepwise approximation to R4 growth (or other chosen growth factor) more easily constructed but is not preferred as the flow rate will have fairly abrupt changes within the stent. The ending radius of each graft segment Si, at length Li (measured from the start of the graft) is preferably unitary, or ri is designed so that $ri^4/Li$ the same constant value at each length Li.

Similarly, growth in the radius with length can occur piecewise. For instance, the graft's outer envelope may linearly increase between set graft radii, ri in piecewise steps. For instance, there could be a series of lengths Li where the radius ri is such that $ri^4/Li$=constant, such as by having support rings at lengths Li. Between such $4^{th}$ order radii, the graft or stent could grow linearly or by other growth rates. Faster growth, and faster flow, such as linear growth (R1) can be used. Such a step wise growth approximates fourth order growth and may be more efficient to manufacture. However, this is not preferred as the flow will inconsistently change in the graft. While a $4^{th}$ order increase (R4) is preferred for the outer envelope of the graft, any preferably monotonically increasing graft diameter with length will provide a benefit, in that radius growth with length helps offset reduced flow with length in the existing constant diameter grafts. An example is depicted in FIG. 2A showing a lengthwise cross section through a graft 20, that starts and ends with constant radius sections 10, and has a series of three radii 11 where amongst themselves, they grow with at $r^n/l$ constant, where $1<n\leq 4$ or $n\geq 4$, but between the three radii, the growth connecting adjacent radii is linear 12. The set radii of R4 growth could be supported with external or internal rings. Using faster growth rates, such as increasing radius with $r^3/L$ or $r^2/L$ being constant, (R3 or R2 growth), and connecting those radii with linear growth, is in the scope of the invention Graft or stent growth by $x^2$ or $x^3$ or a combination in whole or in part, can also provide a benefit, as flow is increased, which can be useful in areas of the graft or stent where growth might accumulate from deposits with slower flow. For instance, a portion of the stent or graft can be R4, then change to R3 for a second portion, then revert to R4 to the end.

In one embodiment, for a graft or stent of selected length L1, the upstream diameter areas well as the growth factor is chosen to provide the desired flows and ending diameter. For a particular ending diameter, a variety of starting diameters, lengths and growths factors can produce the desired outflow. Additionally, the invention includes grafts or stents that have a portion that does not grow, for instance, the starting end of the graft, or the terminating end of the graft can be constant diameter, or both. Preferably the graft or stent diameter is monotonically increasing (e.g., not decreasing) over the length of the graft. Typical starting graft diameters can be 4 mm, 6 mm or 8 mm such as, for instance, dialysis. The smaller diameters are useful when tapping small veins.

Rn growth over the entire stent or graft or portions thereof, such as n>4, are considered to be "unitary-like" or "near constant conductance flow" stents or grafts. When $r^n/l$ is constant, n<4 implies faster radial growth and flow than R4 growth and R4 flow, and n>4, implies slower radial growth and slower flow than R4 growth. Each provides increased flow over the standard constant diameter stent or graft. As used herein, flow is volumetric fluid velocity ($m^3/s$).

Radius growth with length of a stent or graft is so that $r^n/l$ remain a constant, in all or a portion of the stent, where n>1, is within the scope of the invention. All segmented stents or grafts with segments or portions that are unitary or unitary-like growth, are within the scope of the invention. However, it is preferred that the growth of the stent or graft in each segment or portion increases uniformly up to the ending segment radius. Stent growth overall is preferred to be monotonic growth but is not required.

In some applications, such as in long grafts or stents, fourth order graft or stent growth (R4 growth or $r^4/l$=constant) may present an ending diameter that is too large for the landing site. In this case, a graft or stent that preferably expands monotonically with length, but less than R4 growth, will still provide a benefit, as the flow loss through such a graft or stent will be less than that from R4 growth, but greater than a constant diameter graft or stent. For instance, growth of "near constant conductance flow" is such that $r^n/l$ is constant, where n>4, provides such slower growth and flow than R4 growth.

An expanding or increasing dimeter stent is suitable for all stent types (braided, woven, laser cut mesh, and either self-expanding or balloon expandable) for the venous system. While a $4^{th}$ order polynomial increase is preferred for the outer envelope of all or portions of the stent (excluding for instance, constant diameter starting and possibly ending sections). These growth factors, e.g., $r^n/L$ where n<4 will grow faster than a constant conductance flow stent, and hence provide increasing flow rates, which can be a benefit in areas where deposits may accumulate, causing restenosis, Slower growth rates, e.g., where $r^n/L$ is constant, where n>4, such as n=5, 6, or 7 will be beneficial where long length stents or long stent stacks (e.g., multiple overlapping stents) or grafts are contemplated. While such growth is slower that $r^4$ growth and hence the volumetric flows is less than $r^4$ growth, the added benefit is that the ending radius size will be smaller than that in $r^4$ growth, and hence is more likely to be acceptable in a biological conduit system, such as a vein or artery. All such $r^n$ growth still provides increased flow over constant diameter conduits.

For instance, fabrication of a stent or graft with $r^4$ growth will yield a gradually expanding tube that will double its radius at 16 cm length. In many applications, this growth is too quick, resulting in an ending radius that is too large for the application. A more practical formulation is to keep $r^5/l$ or even $r^6/l$ or $r^7/l$ or larger, constant over the length of the stent or portions thereof. This will yield longer tube lengths before the radius doubles (Table 3); the conductive performance (volumetric flow) will be less than the constant $r^4/l$ formulation but still better (greater than) that of a uniform cylinder. The ending diameters for various lengths with initial diameters of, 6, 8, and 10 mm is shown in Table 4.

TABLE 3

Conduit radius increase with length

| Constant Variable | Length at which $R_{initial}$ doubles (cm) |
|---|---|
| $\frac{r^2}{L}$ | 4 |
| $\frac{r^3}{L}$ | 8 |
| $\frac{r^4}{L}$ | 16 |
| $\frac{r^5}{L}$ | 32 |
| $\frac{r^6}{L}$ | 64 |

TABLE 4

Initial and end diameter of uniform cylindrical and test conduits

| Constant Geometric Factor | Initial Diameter (mm) | Ending Diameter at L = 160 mm (mm) | Ending Diameter at L = 310 mm (mm) | Ending Diameter at L = 620 mm (mm) |
|---|---|---|---|---|
| r | 4 | 4.00 | 4.00 | 4.00 |
|  | 6 | 6.00 | 6.00 | 6.00 |
|  | 8 | 8.00 | 8.00 | 8.00 |
|  | 10 | 10.00 | 10.00 | 10.00 |
| $\frac{r^4}{L}$ | 4 | 8.00 | 9.44 | 11.22 |
|  | 6 | 12.00 | 14.16 | 16.84 |
|  | 8 | 16.00 | 18.88 | 22.45 |
|  | 10 | 20.00 | 23.60 | 28.10 |
| $\frac{r^5}{L}$ | 4 | 6.96 | 7.95 | 9.13 |
|  | 6 | 10.45 | 11.92 | 13.70 |
|  | 8 | 13.93 | 15.90 | 18.26 |
|  | 10 | 17.41 | 19.87 | 22.83 |
| $\frac{r^6}{L}$ | 4 | 6.35 | 7.09 | 7.96 |
|  | 6 | 9.52 | 10.63 | 11.94 |
|  | 8 | 12.70 | 14.18 | 15.92 |
|  | 10 | 15.87 | 17.72 | 19.89 |

To demonstrate performance of slower growth stents, the following experiment was done:

Fabrication of Experimental Conduits

To test less aggressive growth stent or graft designs, $r^n$ growth conduits with n>4 were designed using engineering software (Autodesk, Inc.; San Rafael, CA) and fabricated in a commercial 3D printer (Stratasys; Eden Prairie, MN).

Experimental Test Model

Figure 13:
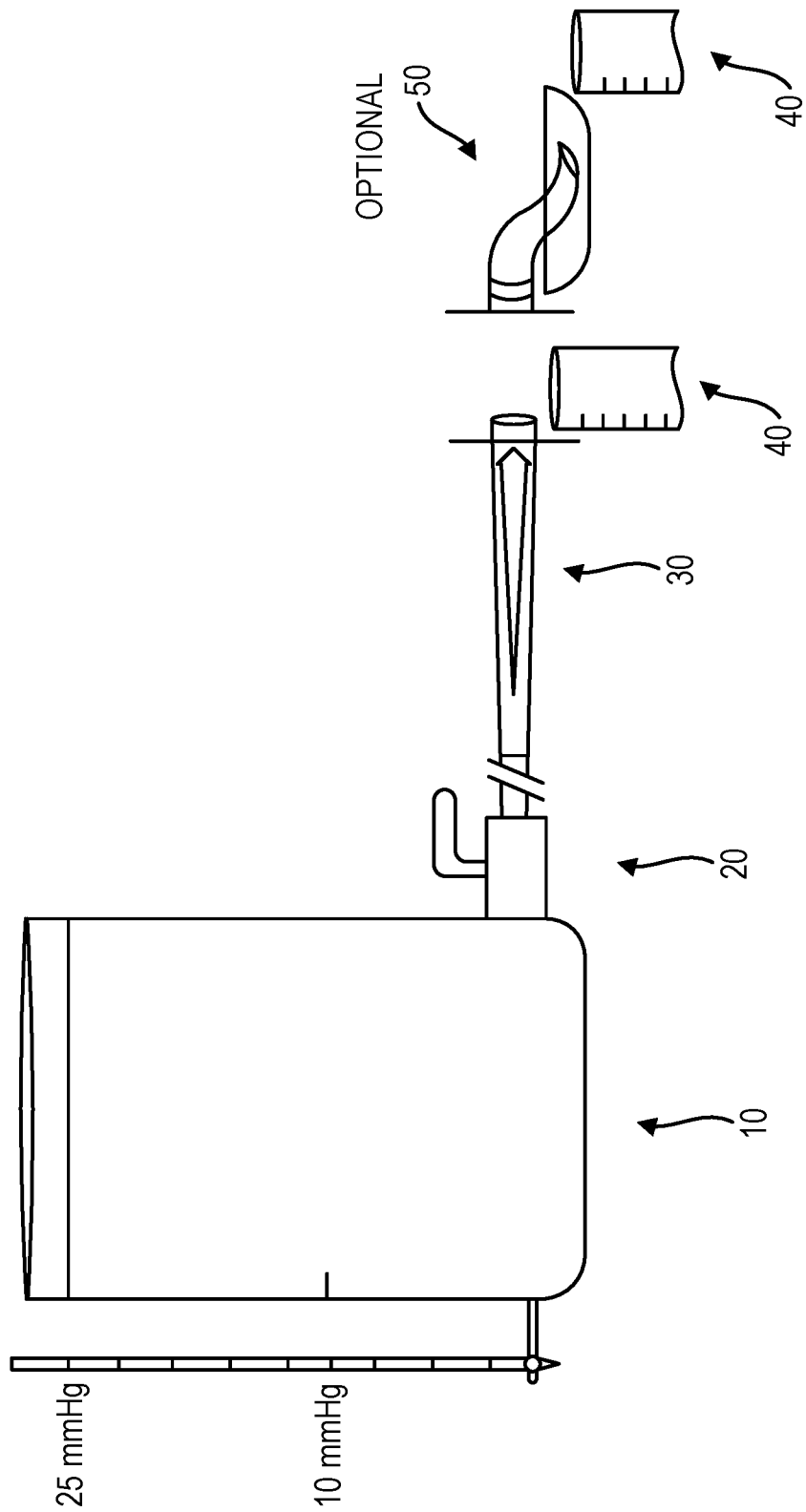
FIG. 13 is an illustration of a side view of one experimental system used to test the output of an expanding conduit.
Figure 14A:
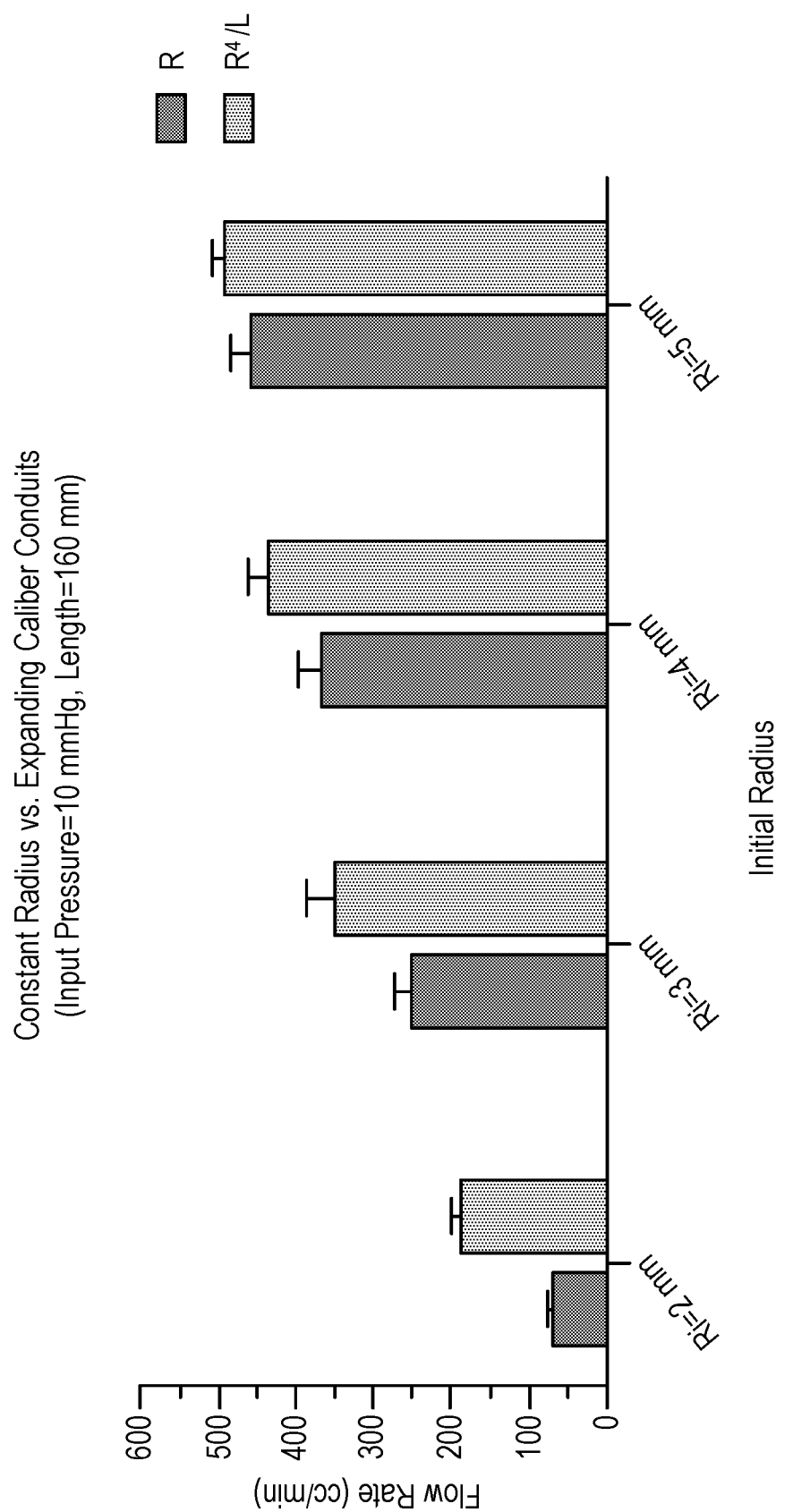
FIG. 14A is a set of bar graphs comparing flow rates of constant radius flow versus constant conductance flow through grafts of various diameters and length 160 mm where the initial pressure was 10 mmHg in the experimental setup of FIG. 13.
Figure 14B:
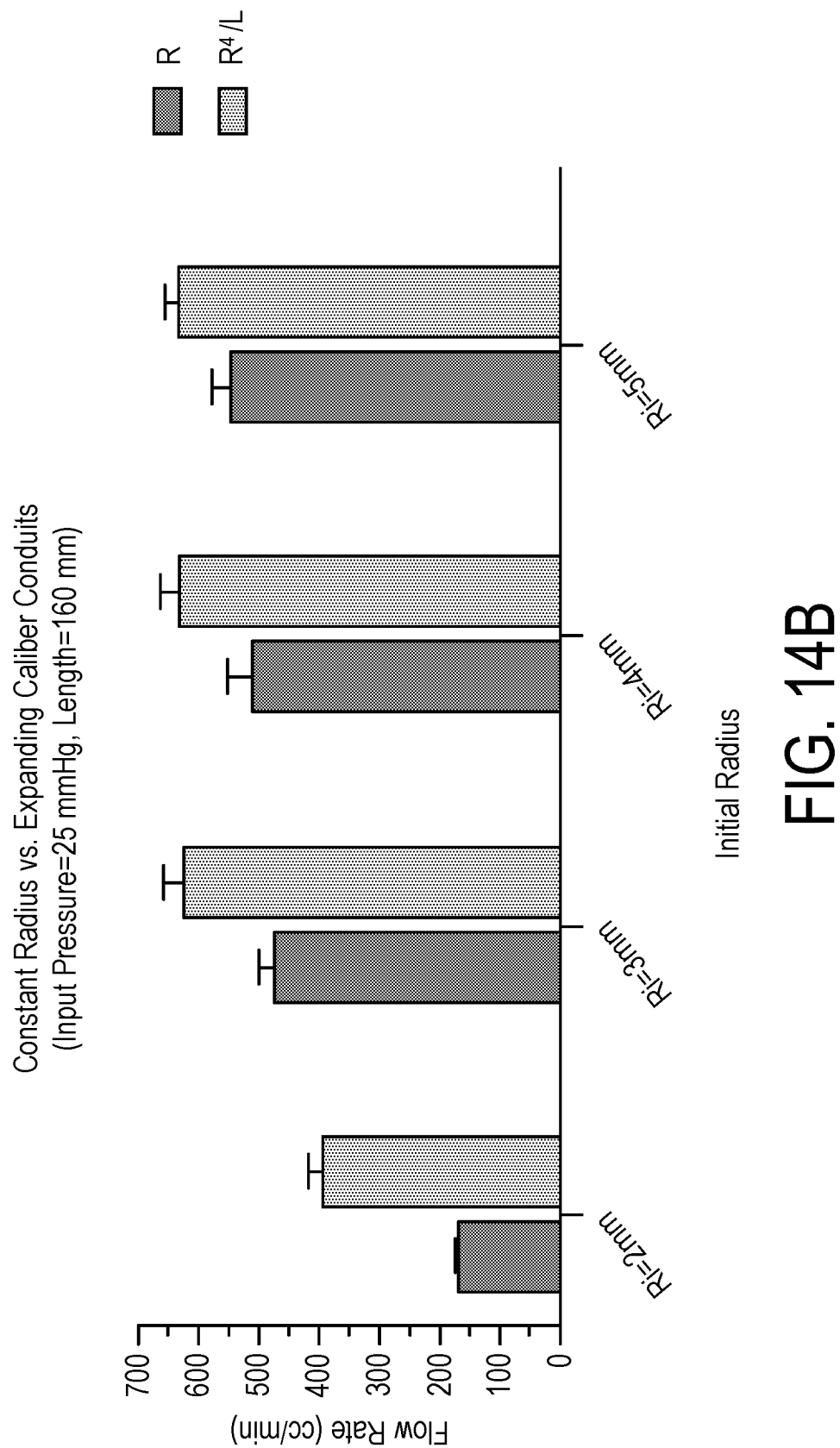
FIG. 14B is a set of bar graphs comparing flow rates of constant radius flow versus constant conductance flow through grafts of various diameters and length 160 mm where the initial pressure was 25 mmHg in experimental setup of FIG. 13.

The basic flow model consists of a header tank 10 with outflow controlled by a calibrated ball valve 20 (FIG. 13). The ball valve was kept open at the same setting for all flows. The various conduits 30 tested were connected to the ball valve. Each conduit had an initial starting length li; here, 1 cm, wherein the radius was constant. It is believed that the constant starting radius allows flow from the pressurized system to stabilize before entering the expanding section. It also avoids the potential ambiguity of evaluating $r^n/l$ as l→0. Conduit outflow was open to the atmosphere (open system) and was allowed to drain into a graduated cylinder 40 for timed measurement (cc/minute). In some experiments, a partially closed system of drainage was used: the conduits were connected to a short Penrose drain 50 (Diameter=3.5 cm; Length=13 cm) discharging under the fluid level in a shallow pan before emptying into the output cylinder (option, FIG. 13). The system prevented air from entering the conduit at the discharge end, functioning similar to the Heimlich valve. The tank system was filled with a 2:3 mixture of glycerol and water with a viscosity of 0.04 poise. Each flow measurement is an average of 5 runs. As shown in the bar grafts of FIGS. 14A and 14B, 15A and 15B, the flow rate of a constant diameter conduit is always less than the expanding conduits, for all length tested (1.6 cm, 3.1 cm and 6.2 cm) and for all starting radii tested of 2 mm, 3 mm 4 mm, and 5 mm. As expected, flow rates with $r=K*(\sqrt[4]{l})$ was greater than flows with $r=K*(\sqrt[5]{l})$ which flows were greater than flows with $r=K*(\sqrt[6]{l})$, for two different starting pressures (FIGS. 14A and 14B).

Results

Figure 15A:
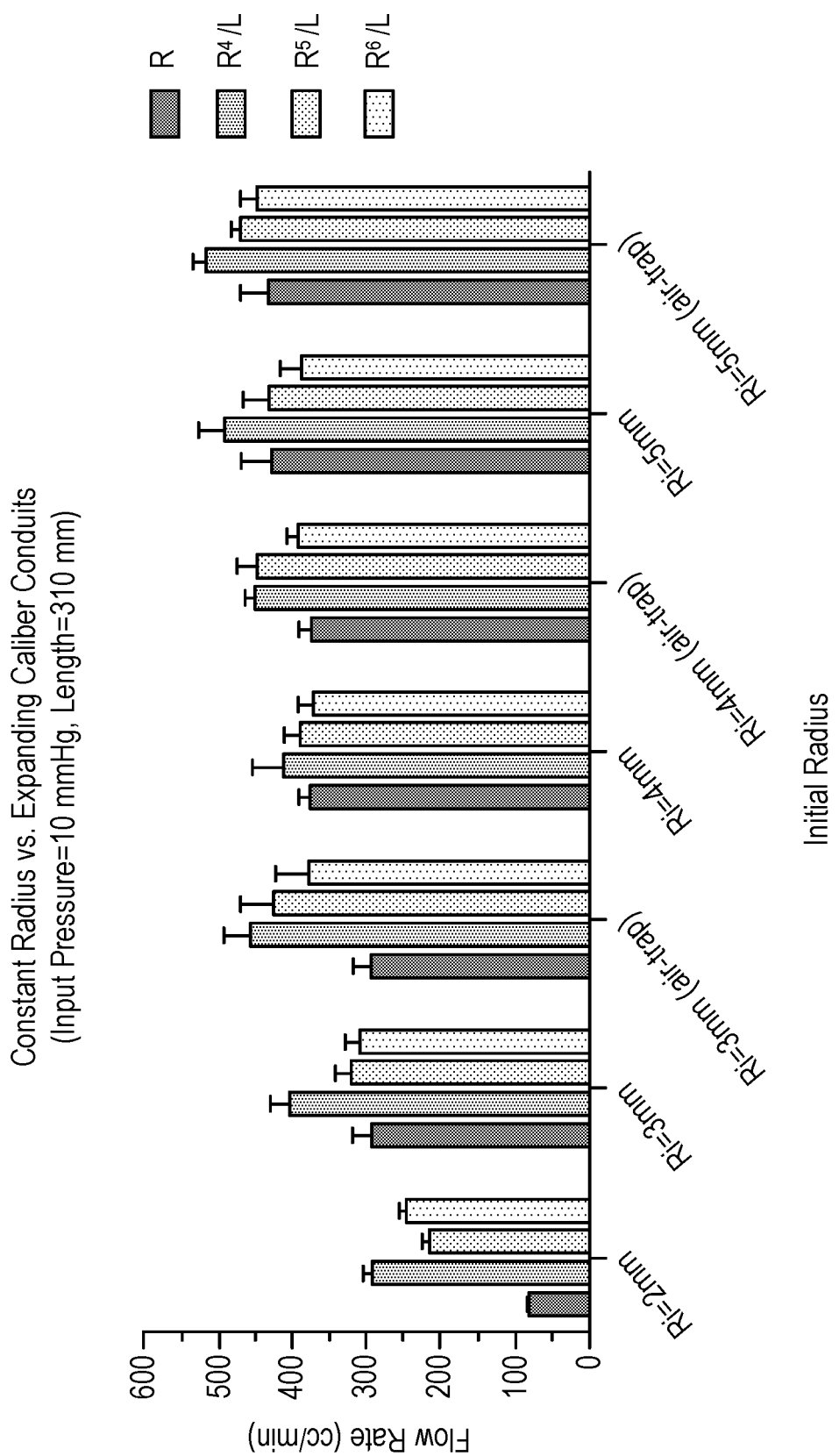
FIG. 15A is a set of bar graphs comparing flow of constant radius flow versus $R^4/L$, $R^5/L$ and $R^6/L$ flow through grafts of various diameters and length of 310 mm with and without an air trap where the initial pressure was 10 mmHg in the setup of FIG. 13.
Figure 15B:
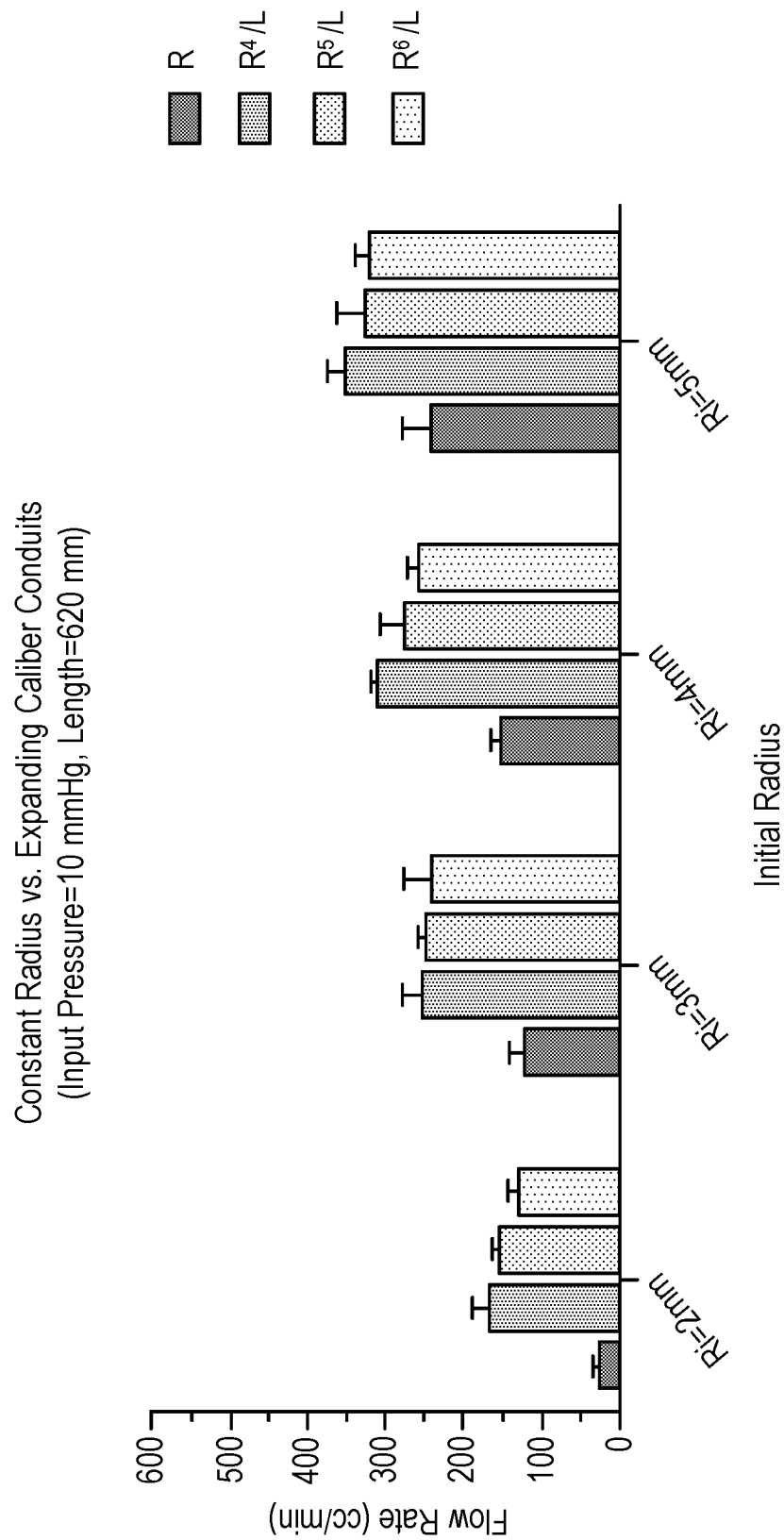
FIG. 15B is a set of bar graphs comparing flow of constant radius flow versus $R^4/L$, $R^5/L$ and $R^6/L$ flow through grafts of various diameters and length of 620 mm where the initial pressure was 10 mmHg in the setup of FIG. 13.

The flow rates of expanding caliber conduits ($r^{4-6}$) compared to traditional constant radius cylindrical conduits are shown in Table 5 and FIGS. 15A and 15B. The expanding caliber stents yields a significantly improved flow from 14% to 563% in all but a few instances. In the latter instances, the outflow stream was observed to be separated from part of the tube outlet circumference, suggesting flow separation from the wall; i.e., the flow was no longer laminar for some length near the outflow end. This problem was substantially reduced when the Penrose air-trap was used (Table 6). The air trap restricts the flow of air into the conduit at the discharge end, more closely emulating a closed fluid flow system, like the arterial or venous systems. Flow separation/cavitation should not be an issue in closed biological flows.

In closed flows where the fluid completely fills the conduit and the flow is driven by a pressure gradient, the incidence of transition to non-laminar flow should be reduced, in an expanding conduit, as in an expanding conduit, where $r''/l$ is constant, the fluid velocity still declines with length.

TABLE 5

Mean conduit flow rate when R, $R^4/L$, $R^5/L$, and $R^6/L$ are held constant (no air-trap)

| Conduit Length (mm) | Initial Radius (mm) | Constant Radius Flow (cc/min) | Constant $R^4/L$ Flow (cc/min) (% improvement) | Constant $R^5/L$ Flow (cc/min) (% improvement) | Constant $R^6/L$ Flow (cc/min) (% improvement) |
|---|---|---|---|---|---|
| Input Pressure = 10 mmHg | | | | | |
| 160 | 2 | 71 | 188 (+165%***) | — | — |
| | 3 | 251 | 349 (+39%***) | — | — |
| | 4 | 368 | 435 (+18%**) | — | — |
| | 5 | 458 | 492 (+7%) | — | — |
| 310 | 2 | 81 | 294 (+263%***) | 216 (+167%***) | 247 (+205%***) |
| | 3 | 294 | 406 (+38%***) | 321 (+9%) | 308 (+5%) |
| | 4 | 373 | 411 (+10%) | 387 (+4%) | 369 (−1%) |
| | 5 | 428 | 489 (+14%*) | 428 (0%) | 383 (−11%) |
| 620 | 2 | 26 | 166 (+538%***) | 154 (+492%***) | 129 (+396%***) |
| | 3 | 122 | 253 (+107%***) | 249 (+104%***) | 240 (+97%***) |
| | 4 | 149 | 310 (+108%***) | 275 (+85%***) | 256 (+72%***) |
| | 5 | 240 | 352 (+47%***) | 327 (+36%**) | 320 (+33%**) |
| Input Pressure = 25 mmHg | | | | | |
| 160 | 2 | 169 | 398 (+136%***) | — | — |
| | 3 | 478 | 628 (+31%***) | — | — |
| | 4 | 513 | 636 (+24%***) | — | — |
| | 5 | 550 | 637 (+16%***) | — | — |
| 310 | 2 | 157 | 427 (+172%***) | 301 (+92%***) | 285 (+82%***) |
| | 3 | 401 | 512 (+28%***) | 377 (−6%) | 386 (−4%) |
| | 4 | 475 | 575 (+21%***) | 447 (−6%) | 487 (+3%) |
| | 5 | 549 | 662 (+21%**) | 491 (−11%*) | 520 (−5%) |
| 620 | 2 | 68 | 451 (+563%***) | 364 (+435%***) | 301 (+343%***) |
| | 3 | 267 | 520 (+95%***) | 476 (+78%***) | 433 (+62%***) |
| | 4 | 403 | 551 (+37%***) | 504 (+25%***) | 509 (+26%***) |
| | 5 | 503 | 632 (+26%**) | 592 (+18%***) | 522 (+4%) |

*P < 0.05 vs. constant radius flow
**P < 0.01 vs. constant radius flow
***P < 0.001 vs. constant radius flow

TABLE 6

Mean conduit flow rate with and without Penrose air-trap (conduit length = 310 mm)

| Initial Radius (mm) | Constant R Flow[a] (cc/min) | Constant $R^4/L$ Flow (cc/min, %) | Constant $R^4/L$ + air-trap Flow (cc/min, %) | Constant $R^5/L$ Flow (cc/min, %) | Constant $R^5/L$ + air-trap Flow (cc/min, %) | Constant $R^6/L$ Flow (cc/min, %) | Constant $R^6/L$ + air-trap Flow (cc/min, %) |
|---|---|---|---|---|---|---|---|
| Input Pressure = 10 mmHg | | | | | | | |
| 3 | 294 | 406 (+38%***) | 456 (+55%***) | 321 (+9%) | 424 (+44%***) | 308 (+5%) | 376 (28%**) |
| 4 | 373 | 411 (+10%) | 450 (+21%***) | 387 (+4%) | 444 (+19%***) | 369 (−1%) | 389 (+4%) |

TABLE 6-continued

Mean conduit flow rate with and without Penrose air-trap (conduit length = 310 mm)

| Initial Radius (mm) | Constant R Flow[a] (cc/min) | Constant $R^4/L$ Flow (cc/min, %) | Constant $R^4/L$ + air-trap Flow (cc/min, %) | Constant $R^5/L$ Flow (cc/min, %) | Constant $R^5/L$ + air-trap Flow (cc/min, %) | Constant $R^6/L$ Flow (cc/min, %) | Constant $R^6/L$ + air-trap Flow (cc/min, %) |
|---|---|---|---|---|---|---|---|
| 5 | 428 | 489 (+14%*) | 500 (+17%*) | 428 (0%) | 467 (+9%*) | 383 (−11%) | 443 (+4%) |
| | | | Input Pressure = 25 mmHg | | | | |
| 3 | 401 | 512 (+28%***) | 570 (+42%***) | 377 (−6%) | 553 (+38%***) | 386 (−4%) | 449 (+12%*) |
| 4 | 475 | 575 (+21%***) | 602 (+27%**) | 447 (−6%) | 566 (+19%**) | 487 (+3%) | 505 (+6%) |
| 5 | 549 | 662 (+21%**) | 638 (+16%**) | 491 (−11%*) | 602 (+10%**) | 520 (−5%) | 553 (+1%) |

*P < 0.05 vs. constant radius flow
**P < 0.01 vs. constant radius flow
***P < 0.001 vs. constant radius flow
[a]Flow separation did not occur in the constant radius conduits; Penrose air-traps did not affect these flows.

Accretive manufacturing (3-D printing) makes it much easier to fabricate expanding caliber stents or grafts for biological use. 3D printing with Nitinol is possible for stents, but traditional stent manufacturing techniques could also be used for these expanding stents.

There is a practical limit to the length of the stent or graft depending upon location and use. Examination of Table 3 (length of conduit when initial radius doubles) and Table 5 (measured flow rated for the conduits tested without an air trap) suggests that up to ≈16 cm is practical for designs keeping $r^4/L$ constant. As shown in Table 7, for common iliac vein stents of 14 mm diameter, the ending radius is calculated for various length conduits for different $r^N$ N=4, 5, or 6. with all conduits having an initial starting length (1 cm) of constant radius. As shown, combinations up to 64 cm length appear practical keeping $r^5/L$ constant. Longer lengths may be required for particular applications and are possible keeping $r^6/L$ or $r^7/L$ or higher r values constant. Fabrication techniques described above or known to those of ordinary skill in the art may be used to construct the rN expanding sent/conduit.

The Rn expanding caliber grafts may have an advantage over the traditional cylindrical prosthetics in the following areas of vascular surgery:

Dialysis Grafts

Inadequate flow for effective dialysis is a common problem with legacy dialysis grafts. A 3 mm radius 31 cm length conduit (which approximates commonly used dialysis grafts) yields 294 and 401 cc/min (10 & 25 mm Hg input pressure) in the test bed. In comparison, the expanding configurations yield a 28-38% more flow (nearly 50% more flow with the Penrose air-trap). These flows are for 10- and 25-mm Hg input pressures, respectively. Quantitative flows in patients may be different for higher input pressures. While quantitative duplication of clinical flows in the test bed is not to be expected, the relative flow advantage is a useful indicator. Graft thrombosis and intimal hyperplasia likely will be reduced. Grafts are used to correct intimal hyperplasia at the venous end of dialysis grafts and fistulas. An expanding caliber graft may function better in these locations. Grafts are also used to correct intimal hyperplasia at the venous end of dialysis grafts and fistulas.

Venous Grafts

Venous grafts were used in veno-venous bypasses 50 years ago but have largely fallen out of use since the introduction of venous stents. Even then, it was known that grafts to be used in the venous system had to be larger (lesser resistance) than the ones used in the arterial system, as the pressure gradient is lower in the venous system. Prosthetic grafts are still occasionally required in complex reconstructions involving the large central veins. The expanded configuration may function better in these situations. Grafts are also used to correct intimal hyperplasia at the venous end of dialysis grafts and fistulas. An expanding caliber graft may function better in these locations.

Arterial Grafts

Prosthetic use in arterial applications has declined as well, substituted by stents or autogenous material. Arterial grafts are still used to a greater extent in arterial bypasses than in the venous system. The expanded configuration is likely more efficient and may have improved long-term patency than the legacy design in these applications. Prosthetic grafts are avoided in peripheral arterial bypasses in general and particularly when the inflow or outflow is marginal reducing the pressure gradient to maintain flow. The expanded configuration may find a place for use in these challenging situations. Use of prosthetics is faster (less operating time) and less laborious than harvesting or constructing autogenous grafts from autologous material (which may be unavailable).

Stent Supported Grafts

These composite stent/grafts are used in specific anatomic locations where the prosthetic is subject to external compression/stress. Flow characteristics of the expanded configuration may function better where both the stent and graft expand equally. Indeed, the stent expansion may be greater, but the graft will control/limit the expansion of the stent. Both should be expanding in diameter with length.

As will be understood by one of skill in the art, the length in in $r^n/l$ in constant conductance flow grafts ($r=\sqrt[4]{l}$), or the near constant conductance flow conduits, is measured from the start of the conduit, not the start of the expanding section. This provides for smooth transition of flow through into the expanding section. Conduits ($r=\sqrt[n]{l}$ where n>4) can have endless applications where the flow rate through the application is an important factor to the functioning of the system, including the arterial system. In biological systems, use of expanding radii grafts should greatly reduce restenosis in these grafts.

Graft Designs

In one embodiment, for a graft of selected length L1, the upstream and downstream terminating diameters are chosen (for instance, the upstream diameter>4 for slower growth and slower flow rates than a constant flow design. If the resulting outflow is too fast, a short ending segment might have a constant diameter, or a reducing diameter section, to slow the flow. Alternatively, the starting and ending diameters can be chosen, the selected length, and then solve for the best filling value of n in $r^n/l$, over the selected length of non-constant section. Note that n does not have to be an integer value. A similar design can be utilized to construct long grafts in steps or segments, by choosing the segment ending diameters and selecting the geometric expansion to be used between the segments.

Grafts can have one or more portions that are constant conductance flow or near constant conductance flow. Consider a graft that has an initial radius r1 of 15 mm (or 1.5 cm) and remains constant for two cm. For the next 5 cm, the graft is unitary, with a starting radius of 1.5 cm. In other words, for the next 5 cm, $r^4/L$ remains constant, where L is the distance from the starting point of the graft, (here L starts at 2 cm), that is, to the $7^{th}$ cm of the graft, L=7 cm. At the end or the unitary graft (or near unitary) portion, the radius in the final portion may further increase, remain constant or even decrease (not preferred). For instance, at the end of the unitary portion described above, the graft may continue for another 2 cm but over that 2 cm, the radius may smoothly decline, such as linearly (e.g., a first order polynomial), to end at the normal radius of the resident vein, and thus allow for a smooth flow transition from the end of the unitary portion to the end of the graft.

Venous Stents

The considerations above for long grafts, that is, having a portion of the graft with near constant conductance flow, are also applicable to long venous stents, or stent stacks (consecutive stents placed end to end possibly with overlap).

A stenosis is often treated with a stent. Stents are generally cylindrically shaped devices which function to expand when deployed. Stents may be balloon expandable or self-expanding. The balloon expandable stent is a stent that is usually made of a coil, mesh, or zigzag design. The stent is pre-mounted on a balloon and the inflation of the balloon plastically expands the stent with respect to the balloon diameter. Self-expanding stents are tubular devices stored in an elongated configuration in what is called a delivery system or applicator. The applicator is introduced percutaneously into the body into a vessel and guided through the vessel lumen to the location where the stent is to be released. Upon release, the stent material auto expands to a predetermined size. Auto expansion is rather weak in many self-expanding stents. This may require pre-dilatation of the stenotic lesion with a balloon of appropriate size before the stent is deployed to enable it to expand to its intended size. In some stents, auto expansion must be assisted with 'post dilatation' for full expansion of the stent to occur.

TABLE 7

Expanding stent caliber configuration for
Iliac vein (Initial Diameter = 14 mm)

| Length (cm) | Constant $R^4/L$ Radius (mm) | Constant $R^5/L$ Radius (mm) | Constant $R^6/L$ Radius (mm) |
|---|---|---|---|
| 0 | 14.00 | 14.00 | 14.00 |
| 1 | 14.00 | 14.00 | 14.00 |
| 2 | 16.65 | 16.08 | 15.71 |
| 3 | 18.43 | 17.44 | 16.81 |
| 4 | 19.80 | 18.47 | 17.64 |
| 5 | 20.93 | 19.32 | 18.31 |
| 6 | 21.91 | 20.03 | 18.87 |
| 7 | 22.77 | 20.66 | 19.36 |
| 8 | 23.55 | 21.22 | 19.80 |

TABLE 7-continued

Expanding stent caliber configuration for
Iliac vein (Initial Diameter = 14 mm)

| Length (cm) | Constant $R^4/L$ Radius (mm) | Constant $R^5/L$ Radius (mm) | Constant $R^6/L$ Radius (mm) |
|---|---|---|---|
| 9 | 24.25 | 21.73 | 20.19 |
| 10 | 24.90 | 22.19 | 20.55 |
| 11 | 25.50 | 22.62 | 20.88 |
| 12 | 26.06 | 23.01 | 21.18 |
| 13 | 26.58 | 23.38 | 21.47 |
| 14 | 27.08 | 23.73 | 21.73 |
| 15 | 27.55 | 24.06 | 21.99 |

The expanding caliber stents may have an advantage over the traditional cylindrical prosthetics in the following areas of vascular surgery.

Venous Stents

Venous caliber naturally scales up as tributaries coalesce. The iliac veins are the most common site for stent placement. Common femoral vein is 12 mm in diameter. The external iliac vein is ≈14 mm in diameter; the common iliac vein is slightly larger at ≈16 mm diameter. A gradual configuration as shown in Table 7 starting at 14 mm diameter may provide greater flow than current cylindrical designs. In-stent restenosis is a substantial problem in iliac vein stents and correlates with low inflow. It is believed that the expanding stent will ameliorate these problems of legacy design. The most frequent cause of stent thrombosis is poor inflow; outflow problems are less frequent causes. In either case, the pressure gradient ($\Delta P$) is reduced causing flow decrease. A greater flow rate may be possible with the reduced gradient if the expanded configuration stent is used. Hence, a stent stack can be designed starting at 12 cm diameter in the common femoral, growing at RN until it reaches 14 mm diameter at the external iliac, then growing at RM until it reaches 16 mm diameter at the common iliac and then growing, for instance, at R4 to the end of the stack. Her N and M can be solved for given the respective lengths in each vein segment to be stented. Alternatively, a single RN growth can be chosen, to best fit the circumstances.

As will be understood by one of skill in the art, the length in in $r^n/l$ in constant conductance flow conduits ($r=\sqrt[4]{l}$), or the near constant conductance flow conduits, is measured from the start of the conduit, not the start of the expanding section. This provides for smooth transition of flow through into the expanding section. Conduits ($r=\sqrt[n]{l}$ where n>4) can have endless applications where the flow rate through the application is an important factor to the functioning of the system, including the arterial system. In biological systems, use of expanding radii grafts should greatly reduce restenosis in these grafts.

Designs

In one embodiment, for a graft of selected length L1, the upstream and downstream terminating diameters are chosen (for instance, the upstream diameter>4 for slower growth and slower flow rates than a constant flow design. If the resulting outflow is too fast, a short ending segment might have a constant diameter, or a reducing diameter section, to slow the flow. Alternatively, the starting and ending diameters can be chosen, the selected length, and then solve for the best filling value of n in $r^n/l$, over the selected length of non-constant section. Note that n does not have to be an integer value. A similar design can be utilized to construct long grafts in steps or segments, by choosing the segment ending diameters and selecting the geometric expansion to be used between the segments.

Grafts can have one or more portions that are constant conductance flow or near constant conductance flow. Consider a graft that has an initial radius r1 of 15 mm (or 1.5 cm) and remains constant for two cm. For the next 5 cm, the graft is unitary, with a starting radius of 1.5 cm. In other words, for the next 5 cm, $r^4/L$ remains constant, where L is the distance from the starting point of the graft, (here L starts at 2 cm), that is, to the $7^{th}$ cm of the graft, L=7 cm. At the end or the unitary graft (or near unitary) portion, the radius in the final portion may further increase, remain constant or even decrease (not preferred). For instance, at the end of the unitary portion described above, the graft may continue for another 2 cm but over that 2 cm, the radius may smoothly decline, such as linearly (e.g., a first order polynomial), to end at the normal radius of the resident vein, and thus allow for a smooth flow transition from the end of the unitary portion to the end of the graft.

Venous Stents

The considerations above for long grafts, that is, having a portion of the graft with near constant conductance flow, are also applicable to long venous stents, or stent stacks (consecutive stents placed end to end possibly with overlap).

A stenosis is often treated with a stent. Stents are generally cylindrically shaped devices which function to expand when deployed. Stents may be balloon expandable or self-expanding. The balloon expandable stent is a stent that is usually made of a coil, mesh, or zigzag design. The stent is pre-mounted on a balloon and the inflation of the balloon plastically expands the stent with respect to the balloon diameter. Self-expanding stents are tubular devices stored in an elongated configuration in what is called a delivery system or applicator. The applicator is introduced percutaneously into the body into a vessel and guided through the vessel lumen to the location where the stent is to be released. Upon release, the stent material auto expands to a predetermined size. Auto expansion is rather weak in many self-expanding stents. This may require pre-dilatation of the stenotic lesion with a balloon of appropriate size before the stent is deployed to enable it to expand to its intended size. In some stents, auto expansion must be assisted with 'post dilatation' for full expansion of the stent to occur.

Commonly used self-expanding stents are braided stents, or laser cut stents. A braided stent is a metal stent that is produced by what is called a plain weaving technique. It is composed of a hollow body, which can stretch in the longitudinal direction and whose jacket is a braid made up of a multiplicity of filament-like elements which, in the expanded state of the braided stent, intersects a plane perpendicular to the longitudinal direction at a braid angle. Laser cut stents are constructed from a tube of material (most frequently, nitinol, a nickel titanium alloy), and stainless steel, cobalt, etc. that is laser-cut during production to create a meshed device. The tube is comprised of sequential aligned annular rings that are interconnected in a helical fashion. The tube is compressed and loaded into the delivery device and expands to its original size when released. Nitinol, which has thermal memory, may help stents made of this material expand into position when exposed to body temperature after delivery. Compared with self-expanding braided stents, laser cut stents provide more accurate stent deployment with less foreshortening. Laser cut stents are much less subject to foreshortening but are probably less rigid than braided stents.

The stent, after expansion, is intended to restore the occluded vessel to normal or near normal flow conditions in the stented area. In the arterial and venous system, the stented area should have smooth laminar blood flow of uniform velocity. To help avoid restenosis, or the depositing of material in the stented vein, and the resultant re-occurrence of an occlusion, maintaining adequate flow through the stent is desirable. A stent with a growth portion that is placed over the stenotic area should alleviate these issues.

The iliac veins are the most common location for stent placement. The common femoral vein is ≈12 mm in diameter, the external iliac vein is ≈14 mm in diameter; and the common iliac vein is slightly larger at ≈16 mm diameter (venous caliber naturally scales up as tributaries coalesce). A gradual increasing growth configuration will likely provide greater flow than current constant radius cylindrical designs. In-stent restenosis is a substantial problem in iliac vein stents and correlates with low inflow. It is believed that the expanding stent will ameliorate these problems of legacy designs. The most frequent cause of stent thrombosis is poor inflow; outflow problems are less frequent causes. In either case, the pressure gradient (ΔP) is reduced, causing flow decrease. A greater volumetric flow rate may be possible with a reduced pressure gradient if the expanded configuration stent is used.

In the iliac system, a stent conduit extending from the common femoral vein (12 mm diameter) to the external iliac (14 mm diameter), to the common iliac (16 mm diameter) can be as much as 18 or 19 cm long. As seen in Table 3, at R5 growth, the stent or stent stack through the iliac veins, starting at the common femoral vein, would double to 24 mm at 32 cm. Hence R5, R6 or R7 stent growth could easily be used for stenting the entire iliac vein system. A first stent in the stack would have a starting diameter of 12 cm, and overlapped with the second stent, would have an ending diameter of about 14 cm. Given the length to be covered by the first stent, solve for the best fitting value of N. Repeat for the second and third stents in the stack, the solved for N for each will likely not be the same. Note that N in RN growth does not have to be an integer. Such long stents or stent stacks may jail the hypogastric vein, which is well tolerated.

Indeed, longer stents can be constructed with sections of different growth, such as constant radius (no growth) sections to an R5 growth or higher section and ending with a no growth or R4 growth section. The preferred growth pattern is monotonic growth (non-decreasing growth) over the length of the stent or graft. This piecewise approximation in RN growth may make manufacturing easier, for instance, building a long stent using sections of Z stents.

Stents ($r=\sqrt[n]{1}$ where n>4) can have endless applications where the flow rate through the application is an important factor to the functioning of the system, including the arterial system. Stents are also used to correct intimal hyperplasia at the venous end of dialysis grafts and fistulas. An expanding caliber stent may function better in these locations. In biological systems, use of expanding radii stents should greatly reduce restenosis in these stents. Note for stents-stent balloons 500 are needed that, when expanded, match the form of the expanded stent. See FIG. 7. Such a balloon can be constructed by placing a graft or sleeve over the balloon (not shown), where the graft or sleeve has the desired radius growth shape. As the balloon is expanded, the graft will guide and limit the expanded balloon into the desired shape. A gradual increasing radius growth configuration stent will provide greater flow than current constant radius cylindrical designs.

Sleeved Stents

These composite stent/sleeved or grafts are used in specific anatomic locations where the prosthetic is subject to external compression/stress. Flow characteristics of the expanded configuration may function better where both the stent and graft (a non-elastic sleeve on the exterior of the sent) expand equally. Indeed, the stent expansion may be greater, but the sleeve will control/limit the expansion of the stent. Using a sleeved stent for treatment of aneurysms is such a case.

Stents ($r=K^n\sqrt{l}$ where $n\geq 4$) can have endless applications where the flow rate through the application is an important factor to the functioning of the system, including the arterial system. Stents are also used to correct intimal hyperplasia at the venous end of dialysis grafts and fistulas. An expanding caliber stent may function better in these locations. In biological systems, use of expanding radii stents should greatly reduce restenosis in these stents.

Stent Designs

In one embodiment, for a stent of selected length L1, the upstream and downstream terminating diameters are chosen (for instance, the upstream diameter can be selected as the standard or minimal diameter for the particular vein segment and choosing the downstream diameter to match the desired geometric factor constant, e.g., $r^4/l$, or $r^n/l$ for n<4 for faster growth and flows, or $r^n/l$ for n.4 for slower growth and slower flow rates then a constant conductance flow design. Alternatively, the starting and ending diameters can be chosen and then solve for the best fitting value of n in $r^n/l$, over the selected length L1. Note that n does not have to be an integer value, and n can represent at polynomial of the chosen degree e.g., $4^{th}$ order, $5^{th}$ order polynomial, etc.

The stents described are for a vein or artery segment that is substantially uniform in diameter absent a stenosis. If the vein or artery segment to be stented, normally has a natural increase in size, that natural increase may be accounted for in the designed "unitary" or increased flow stent, or near constant conductance flow stents, for instance, by increasing the selected stent terminating diameter by adding an additional amount equal to the natural increase in vein size, to get a "unitary plus" sized stent, by selecting the best RN growth to get the chosen diameter.

Stents up to 15 cm long are being produced using constant diameter stents in standard dimensions. These current stents are usually of fixed unchanging diameter. However, there are stents manufactured as expanding tapered stents, See U.S. Pat. Nos. 9,655,710; 8,623,070; 7,637,939, typically chosen to fit an expanding biological conduit. The unitary or constant conductance flow stent concept can be used even in long stents, such as 15 or even 20 cm in length, such as for use in the iliac vein. Such long stents may jail the hypogastric vein, which is well tolerated. However, for long stents, the elasticity of the vein wall can be a limiting factor, and a growth factor for slower growth than the $4^{th}$ power for the radius per cm length may be more practical and desirable, such as $5^{th}$, $6^{th}$ or $7^{th}$ power in r.

Additionally, the invention includes stents that have a portion that is increased volumetric flow such as constant conductance or near constant conductance flow. Consider a stent that has an initial radius r1 of 15 mm or 1.5 cm) and remains constant for two cm. For the next 5 cm, the stent is unitary, with a starting radius of 1.5 cm. In other words, for the next 5 cm, $r^4/L$ remains constant, where L is the distance from the starting point of the stent to the expanding section start, and at the $7^{th}$ cm of the stent, L=7 cm). at the end of the growth portion. the stent may continue with a fixed radius or alternatively, the radius in the final portion may further increase with a different RN factor or remain constant or even decrease (not preferred). For instance, at the end of the unitary portion described above, the stent may continue for another 2 cm but over that 2 cm, the radius may smoothly decline, such as linearly (e.g., a first order polynomial), to end at the normal radius of the resident vein, and thus allow for a smooth flow transition from the end of the unitary portion to the end of the stent back into the vein. One design factor is to have the end of the stent designed so that the flow at the end is at least as large as that in terminating vein location.

Slower growth rates than a constant conductance flow stent (e.g., $r^n/l$ is constant) but where n>4, can be used in long stents or grafts with lesser impact on vein walls but still providing the benefit of greater flows then provided by a constant diameter stent. Note the growth exponent n does not have to be an integer and can be a polynomial.

The stents and balloons described herein may include radio markers to allow the balloons or stents to be visualized during placement for proper positioning.

As will be understood by one of skill in the art, the length l used in ($r=k^n\sqrt{l}$), is measured from the start of the conduit, not the start of the expanding section) for standalone stents. Long "stents" can be constructed in steps or segments, by overlapping adjacent stents (such as 2 cm) to create longer stent stacks that emulate a single long stent. Overlapping stent diameters preferably match, by choosing the overlapped segment starting diameters to match, and selecting the geometric expansion of growth factor to match. However, as the stack of stents is used to emulate a single stent, the length used in RN growth is measured from the beginning of the first stent in the stack.

The invention includes unitary or constant conductance balloons or near constant conductance balloons, where the radius of the balloon expands with length to match the growth of the stent. For instance, by varying balloon materials or by use of a balloon sleeve that assumes the desired expanded shape. If the stent is a piece-wise growth described above, the balloon should match the growth. The balloon can be constructed of differing materials to provide such varying expansion, or the balloon can also be sleeved to control its growth into the desired shape, by having the sleeve take on the desired expanded shape.

As described, the unitary or near unitary stent can be designed to fit the vein or arterial restrictions and provide increased flows. The stents are preferable to monotonic growth, but there are instances where the growth can decrease. For instance, if a stent bifurcates into two, the two stents will have smaller diameters than the parent, and the bifurcated stents can grow with constant or near constant conductance flow; in these instances, the length in the bifurcated stent can start at the bifurcation.

Measurement of L in a Growth Section

As described, it is preferred that in a growth section where $R^N/L$ is constant, that L is measured from the beginning of the stent system. If you measure the length from the start of the growth stent, then the growth in this case is not identical to that when length is measured from the start of the system. This occurs because $r=\sqrt[n]{(Kl)}$ in the growth section. The radius is smaller in a growth section when L is measured from the start of the stent system. Note also that the growth constant K is a different value in the two systems, as $K=(rs)^n/Ls$, where rs is the radius at the start of the growth section, and Ls is the stent length at the start of the growth section.

As an example, consider a two stent system, each 10 cm length, with a 1 cm overlap, where the first conduit is constant, radius of 2 cm, the second conduit grows at R4 after the 1 cm overlap.

| L = 0 at beginning of system |
| --- |
| $K = 2^4/10 = 1.6$ <br> length at end of second stent = 19 |
| (radius at $L = 19$) = $\sqrt[4]{KL} = \sqrt[4]{1.6 * 19} = 2.34 = \sqrt[4]{16 * 10} = 3.55$ |

| L = 0 at start of growth conduit |
| --- |
| $K = 2^4/1 = 16$ <br> length at end of second stent = 10 |
| (radius at $L = 10$)) = $\sqrt[4]{KL} = ^4$ |

Clearly, the two measurements of L result in a different growth profile. Measuring L in a growth section from the start of the stent in a growth section is more manufacturer friendly. Otherwise, the manufacturer will have to custom build each stent, with an understanding of the length of the stent system prior to the stent in question. Measuring L from the start of the stent system more closely emulates a single stent particularly in performance.

You can build a stent system using growth stents sections where the growth is referenced from the start of the growth stent. Such a stent system will have different growth profile and different performance characteristics than one where length L is measured from the system start. Care should be taken to understand length measurement in which system was used.

The invention claimed is:

1. An improved flow graft of length L comprising a structure of non-elastic material having a tubular shape when expanded, where the expanded shape includes a radius r at each distance l in the length L of the graft, such that when expanded, the graft has a portion where the radius r at each distance l in the portion, is such that $r^n/l$ is a constant at each distance l in the portion, where n=4, or where the growth of the radius r at each distance l of the length in the portion is monotonic with the length in the portion, but where the growth of r with length is less rapid then that of $r^4/l$=constant, and in either case, the distance l at a beginning end of the graft is either 0 or a constant>0.

2. The improved flow graft of claim 1 where r expands with length in the portion such that that $r^n/l$ is a constant at each distance l in the portion, where n is constant, and n≥4.

3. The improved flow graft of claim 2 where the portion terminates at an end of the graft.

4. The improved flow graft of claim 2 where the portion begins after a beginning end of the graft and ends before a termination of the graft.

5. The improved flow graft of claim 3, where the radius at the start of the portion is R0 at distance L0, and the constant is $R0^n/L0$ where n is the n in $r^n/l$.

6. The improved flow graft of claim 2 where n=4 in the portion.

7. The improved flow graft of claim 2 having a series of plastic rings attached to the graft at a series of lengths Li, where the radius of each plastic ring matches the radius of the graft at each location Li.

8. An improved flow graft comprising a series of tubular segments Si, each segment Si having a radius r at each distance L in the segment, each segment having a starting radius and an ending radius where each starting radius and ending radius has $r^n/L$ constant at the starting and ending radius, where n≥4.0 and where the radius between the starting and ending radius of each segment Si grows monotonically with distance L in the segment with $r^n/L$ constant in each segment Si where 1<n<4 and distance L is measured from a beginning of the improved flow graft.

9. The improved flow graft of claim 8 where the growth between the starting and ending radius i of each segment Li is linear.

10. A method of designing a graft, where the graft has a radius r at each length L of the graft, comprising the steps of choosing a starting radius rs of the graft and a desired ending radius re of the graft, where re>rs, selecting a length L0 of the graft, set the radius of the graft constant for a first portion of the graft, and selecting an N such that: (a) N≥4.0 and setting $r^N/L$ a constant from an end of the first portion to an end of the graft, and (b) the ending radius of the graft resulting from use of the selected N is a value closest to re in distance.

11. The graft of claim 2 where the graft comprises a dialysis graft.

12. The graft of claim 2 where the graft comprises a venous graft.

13. The graft of claim 2 where the graft comprises an arterial graft.

14. The graft of claim 2 where an ending radius of the graft is designed to be positioned downstream in a biological flow.

15. An improved flow graft comprising a series of tubular segments Si, each segment Si having a length and radius r at each distance L in the length for each segment, each segment having a starting radius and an ending radius such that each starting radius and ending radius has $r^n/L$ constant at the starting and ending radius, where n≥4.0 and where the radius between the starting and ending radius grows monotonically with distance in the segment.

16. The improved flow graft of claim 2 which comprises an artificial auxiliary arterio-venous fistula.

17. The improved flow graft of claim 2 which comprises a supported graft.

18. The improved flow graft of claim 2 uses for use as an exterior sleeve covering a stent.

* * * * *